US011888997B1

(12) United States Patent
Bowen et al.

(10) Patent No.: US 11,888,997 B1
(45) Date of Patent: Jan. 30, 2024

(54) CERTIFICATE MANAGER

(71) Applicant: Amazon Technologies, Inc., Seattle, WA (US)

(72) Inventors: Peter Zachary Bowen, Bainbridge Island, WA (US); Todd Lawrence Cignetti, Ashburn, VA (US); Preston Anthony Elder, III, Fairfax, VA (US); Brandonn Gorman, Seattle, WA (US); Ronald Andrew Hoskinson, Herndon, VA (US); Jonathan Kozolchyk, Seattle, WA (US); Kenneth Lawler, Seattle, WA (US); Marcel Andrew Levy, Seattle, WA (US); Kyle Benjamin Schultheiss, Centreville, VA (US); Sandeep Shantharaj, Herndon, VA (US); Param Sharma, Haymarket, VA (US); Jose Maria Silveira Neto, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 16/018,014

(22) Filed: Jun. 25, 2018

Related U.S. Application Data

(60) Provisional application No. 62/652,236, filed on Apr. 3, 2018.

(51) Int. Cl.
  *H04L 9/32* (2006.01)
  *H04L 9/08* (2006.01)
(52) U.S. Cl.
  CPC .......... *H04L 9/3268* (2013.01); *H04L 9/0897* (2013.01); *H04L 9/3247* (2013.01); *H04L 9/3297* (2013.01)

(58) Field of Classification Search
  CPC ... H04L 9/3268; H04L 9/3247; H04L 9/0897; H04L 9/3297; H04L 9/3263; H04L 29/06775; H04L 63/0823
  See application file for complete search history.

(56) References Cited

U.S. PATENT DOCUMENTS

| | | | |
|---|---|---|---|
| 6,035,402 A | * | 3/2000 | Vaeth ...................... H04L 9/321 713/158 |
| 6,671,804 B1 | | 12/2003 | Kent |

(Continued)

OTHER PUBLICATIONS

Dang, Q., "Recommendations for Applications Using Approved Hash Algorithms," National Institute of Standards and Technology (NIST) Special Publication 800-107, Revision 1, Aug. 2012, 25 pages.

(Continued)

*Primary Examiner* — Oleg Korsak
*Assistant Examiner* — Nhan Huu Nguyen
(74) *Attorney, Agent, or Firm* — Davis Wright Tremaine LLP

(57) ABSTRACT

A computing resource service provider provides a certificate management service that allows customers of the computing resource service provider to create, distribute, manage, and revoke digital certificates issued by public and/or private certificate authorities. In an embodiment, customers may use the certificate management service to generate private certificate authority which can issue signed certificates to network entities within the customer enterprise. In an embodiment, the private certificate authority is hosted by the computing resource service provider, and the certificate management service automates the renewal and management of active certificates. In an embodiment, the certificate management service allows customer applications to create, renew, and revoke certificates issued by both private and (Continued)

public certificate authorities via an application programming interface.

20 Claims, 11 Drawing Sheets

(56) References Cited

U.S. PATENT DOCUMENTS

| | | | |
|---|---|---|---|
| 7,395,428 B2* | 7/2008 | Williams | H04L 9/3268 713/170 |
| 7,484,089 B1 | 1/2009 | Kogen et al. | |
| 7,526,642 B2 | 4/2009 | Hurtta et al. | |
| 7,644,270 B1* | 1/2010 | Cherukumudi | H04L 63/0823 709/206 |
| 7,937,583 B2* | 5/2011 | Thornton | H04L 63/0823 713/168 |
| 8,250,361 B2* | 8/2012 | Kido | H04L 63/0823 713/157 |
| 8,370,626 B2 | 2/2013 | Liu et al. | |
| 8,494,485 B1* | 7/2013 | Broch | H04W 12/06 455/410 |
| 8,806,195 B2 | 8/2014 | Wnuk et al. | |
| 8,843,636 B1 | 9/2014 | Wu et al. | |
| 9,032,473 B2 | 5/2015 | Guccione et al. | |
| 9,215,231 B1* | 12/2015 | Bowen | H04L 63/1416 |
| 9,306,935 B2* | 4/2016 | Bowen | H04L 9/3263 |
| 9,332,002 B1* | 5/2016 | Bowen | H04L 63/0823 |
| 9,455,838 B2* | 9/2016 | Gallagher | H04L 9/321 |
| 9,485,101 B2* | 11/2016 | Bowen | H04L 63/0823 |
| 9,552,485 B1* | 1/2017 | Cignetti | H04L 9/3263 |
| 9,730,065 B1* | 8/2017 | Chen | H04L 9/321 |
| 9,773,127 B2* | 9/2017 | Yanagi | H04L 9/321 |
| 9,778,939 B2* | 10/2017 | Johansson | H04L 63/0876 |
| 9,979,553 B2* | 5/2018 | Kommireddy | H04L 9/3263 |
| 10,425,399 B2 | 9/2019 | Kravitz et al. | |
| 2004/0039925 A1 | 2/2004 | McMillan et al. | |
| 2005/0021969 A1* | 1/2005 | Williams | H04L 9/3268 713/176 |
| 2005/0033957 A1 | 2/2005 | Enokida | |
| 2005/0069136 A1* | 3/2005 | Thornton | H04L 63/20 380/277 |
| 2005/0076203 A1 | 4/2005 | Thornton et al. | |
| 2006/0200857 A1* | 9/2006 | Yokota | H04L 9/3263 726/6 |
| 2007/0055882 A1* | 3/2007 | Gaucas | H04L 9/3268 713/175 |
| 2008/0091952 A1 | 4/2008 | Sumner et al. | |
| 2008/0183853 A1* | 7/2008 | Manion | H04L 67/1093 709/223 |
| 2009/0319783 A1* | 12/2009 | Thornton | H04L 9/3226 713/156 |
| 2010/0031025 A1* | 2/2010 | Zhang | H04L 63/20 713/156 |
| 2010/0228970 A1* | 9/2010 | Oka | H04L 9/3263 713/156 |
| 2010/0268942 A1 | 10/2010 | Hernandez-Ardieta et al. | |
| 2010/0275012 A1* | 10/2010 | Kido | H04L 63/0823 380/44 |
| 2011/0113240 A1* | 5/2011 | Fu | H04L 63/0823 713/156 |
| 2011/0197061 A1* | 8/2011 | Chou | H04L 9/006 713/156 |
| 2011/0213961 A1* | 9/2011 | Wnuk | H04L 63/062 713/156 |
| 2011/0219227 A1* | 9/2011 | Sharif | G06F 21/33 713/158 |
| 2012/0023327 A1* | 1/2012 | Nagasaki | H04L 63/0823 713/156 |
| 2012/0023560 A1* | 1/2012 | Yanagi | G06F 21/645 726/6 |
| 2012/0179907 A1 | 7/2012 | Byrd et al. | |
| 2013/0254535 A1 | 9/2013 | Akehurst et al. | |
| 2013/0339740 A1* | 12/2013 | Ben-Shalom | H04L 63/0823 713/175 |
| 2014/0181911 A1* | 6/2014 | Kula | H04L 9/3215 726/4 |
| 2015/0172064 A1 | 6/2015 | Takenaka et al. | |
| 2015/0222604 A1* | 8/2015 | Ylonen | H04L 63/10 713/171 |
| 2015/0236860 A1 | 8/2015 | Brown et al. | |
| 2015/0244707 A1* | 8/2015 | Bowen | H04L 9/14 713/158 |
| 2015/0254451 A1* | 9/2015 | Doane | G06F 9/45558 726/1 |
| 2016/0057132 A1* | 2/2016 | Gibson | H04L 63/0442 713/156 |
| 2016/0142216 A1 | 5/2016 | Turner et al. | |
| 2016/0173286 A1* | 6/2016 | Gallagher | H04L 9/321 713/156 |
| 2016/0173287 A1* | 6/2016 | Bowen | H04L 9/3268 713/156 |
| 2016/0182494 A1* | 6/2016 | Lissounov | H04L 67/1095 726/10 |
| 2016/0211978 A1* | 7/2016 | Bowen | G06F 21/33 |
| 2016/0261563 A1* | 9/2016 | Walter | H04L 63/101 |
| 2016/0323104 A1 | 11/2016 | Mayers | |
| 2016/0342429 A1* | 11/2016 | Johansson | G06F 9/4406 |
| 2017/0006022 A1* | 1/2017 | Gunti | H04L 63/108 |
| 2017/0012786 A1* | 1/2017 | Gallagher | H04L 63/062 |
| 2017/0012967 A1* | 1/2017 | Holloway | H04L 9/3247 |
| 2017/0041151 A1* | 2/2017 | Kommireddy | H04L 9/3228 |
| 2017/0093587 A1* | 3/2017 | Glisson | H04L 63/062 |
| 2017/0118197 A1* | 4/2017 | Murthy | G06F 21/44 |
| 2017/0195122 A1* | 7/2017 | Obaidi | H04L 9/321 |
| 2017/0222981 A1* | 8/2017 | Srivastav | H04L 63/0428 |
| 2017/0228412 A1* | 8/2017 | Agarwal | G06F 16/125 |
| 2017/0279785 A1* | 9/2017 | Kent | H04L 63/0823 |
| 2018/0019993 A1 | 1/2018 | Kravitz et al. | |
| 2018/0219678 A1 | 8/2018 | Medvinsky et al. | |
| 2018/0287804 A1 | 10/2018 | Geisbush | |
| 2019/0074982 A1* | 3/2019 | Hughes | H04L 9/0863 |
| 2019/0207772 A1* | 7/2019 | Hecht | H04L 63/10 |
| 2019/0245700 A1* | 8/2019 | Dobre | H04L 9/321 |

OTHER PUBLICATIONS

"Digital Certificates for Every Security Need," © 2018 DigiCert, Inc., <https://www.digicert.com/digital-certificates> [retrieved Oct. 23, 2018], 4 pages.
"Digital Certificate Template Best Practices White Paper," © 2018 Certified Security Solutions, <https://info.css-security.com/white-papers-certificate-templates> [retrieved Oct. 23, 2018], 7 pages.
"Symantec Private Certification Authority Service (Private CA)," © 2018 DigiCert, Inc., <https://www.websecurity.symantec.com/security-topics/private-ssl> [retrieved Oct. 23, 2018], 9 pages.
Cooper et al., "Internet X.509 Public Key Infrastructure Certificate and Certificate Revocation List (CRL) Profile," Request for Comments: 5280, May 2008, 141 pages.
Nystrom et al., "PKCS #10: Certification Request Syntax Specification Version 1.7," Request for Comments 2986, Nov. 2000, 14 pages.
Nystrom et al., "PKCS #9: Selected Object Classes and Attribute Types Version 2.0," Request for Comments 2985, Nov. 2000, 42 pages.

* cited by examiner

CERTIFICATE MANAGER

CROSS-REFERENCE TO RELATED APPLICATIONS

This application claims the benefit of U.S. Provisional Patent Application No. 62/652,236, filed Apr. 3, 2018, entitled "CERTIFICATE MANAGEMENT SYSTEM," the disclosure of which is herein incorporated in its entirety. This application incorporates by reference for all purposes the full disclosure of U.S. patent application Ser. No. 16/018,004, filed concurrently herewith, entitled "CERTIFICATE AUTHORITY," now issued as U.S. Pat. No. α11,323,274, issued date May 3, 2022, which claims the benefit of U.S. Provisional Patent Application No. 62/652,240, filed Apr. 3, 2018, entitled "PRIVATE CERTIFICATE AUTHORITY," and U.S. patent application Ser. No. 16/018,009, filed concurrently herewith, entitled "CERTIFICATE GENERATION METHOD," now issued as U.S. Pat. No. 11,563,590, issued date Jan. 24, 2023, which claims the benefit of U.S. Provisional Patent Application No. 62/652,235, filed Apr. 3, 2018, entitled "CERTIFICATE TEMPLATE SYSTEM."

BACKGROUND

Computer-based transactions are an important part of running a modern business. By performing operations in a computing environment, transaction data can be exchanged electronically between parties over a computer network thereby allowing the transactions to occur quickly over great distances. However, when exchanging data over a publicly accessible computer network, it takes considerable resources to prevent third parties from interfering with the transaction by impersonating one of the parties or by altering the transaction data. In order to mitigate this risk, a digital certificate may be used to prove the identity of the certificate owner. Such digital certificates are widely used to authenticate the exchange of information between computer systems and therefore, providing improved systems for managing and using digital certificates is an important problem.

BRIEF DESCRIPTION OF THE DRAWINGS

Various techniques will be described with reference to the drawings, in which.

DETAILED DESCRIPTION

Figure 1:
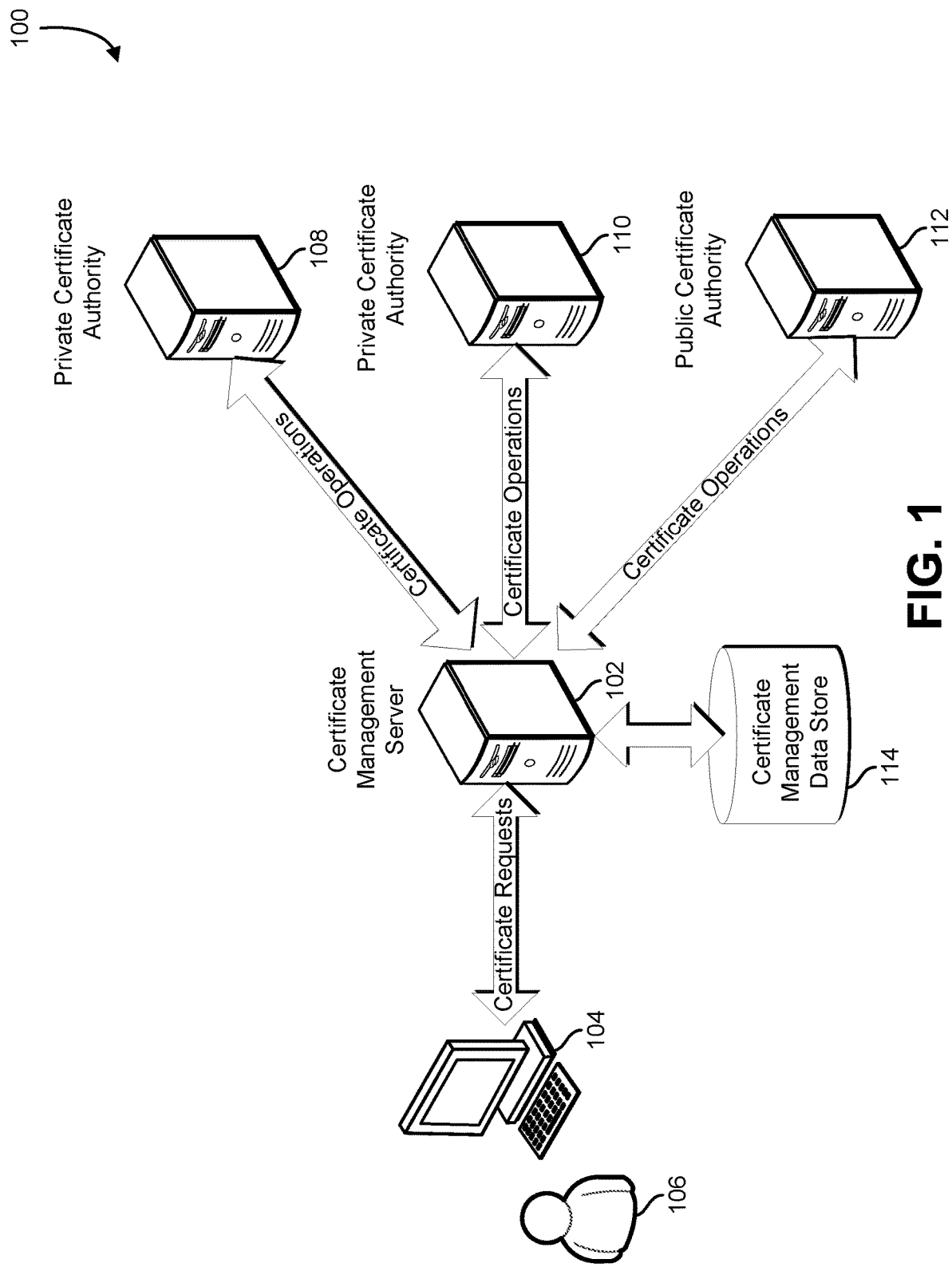
FIG. 1 illustrates an example of a certificate management server that manages digital certificates issued by a plurality of certificate authorities ("CAs"), in an embodiment.

The present document describes a certificate management system that provides an interface for creating and managing a private certificate authority, and for managing private certificates issued from the private certificate authority. In an embodiment, the system includes a certificate management service operated by a computing resource service provider ("CRSP"). In an embodiment, the certificate management service is implemented on a computer server, server cluster, virtual computer system, virtual runtime, or application hosting environment, that provides a user interface in the form of a website that is accessible by users of the certificate management service. In an embodiment, by accessing the website from a client computer system that hosts a web browser, users of the certificate management service can create private certificate authorities, manage private certificates, and perform other tasks. In an embodiment, the interface provided by the website is referred to as the certificate management console.

In an embodiment, users are able to generate private certificate authorities using the certificate management service. In an embodiment, a user submits a request to generate a private certificate authority using the certificate management console, and the certificate management service allocates a set of computing resources to act as a private certificate authority. In an embodiment, the certificate management service configures the set of computing resources in accordance with the request of the user. In an embodiment, the user may perform operations using the private certificate authority using an application programming interface ("API") provided by the private certificate authority, or the certificate management service may be used to generate and manage the private certificate authority. In an embodiment, the certificate management service is a multi-tenant service that provides private certificate authorities and certificate management services for multiple customers.

In an embodiment, the certificate management service provides the ability to manage digital certificates from a plurality of both public and private certificate authorities. In an embodiment, the certificate management console allows the user to import a public certificate, or to request a public certificate from a public certificate authority. In an embodiment, the certificates can be managed along with the private certificates issued by private certificate authorities. In an embodiment, the certificate management service manages the generation, issuance, renewal, and revocation of digital certificates.

In an embodiment, the customer uses the private certificate authority to issue digital certificates for entities within the customer's internal network which are signed with a private key of the private certificate authority. In an embodiment, the private certificate authority is accessible via an application programming interface ("API"). In an embodiment, the API is a network-accessible web API. In an embodiment, the certificate management service provides the customer with an interface for the management of private certificates by interfacing with the private certificate authority via the API. By providing a certificate manager and the ability to create private certificate authorities and associated digital certificates, a computing resource service provider is able to provide a service that has significant advantages over both conventional certificate authorities ("CAs"), and private certificate authorities ("PCAs") deployed and managed within a customer datacenter.

In an embodiment, the certificate management service may be usable via one or more interfaces. In an embodiment, the certificate management service provides an API. The API allows customer applications to create and manage private certificate authorities, and to perform certificate management operations programmatically. In an embodiment, certificate management operations may include creating a digital certificate, revoking a digital certificate, renewing a digital certificate, exporting a digital certificate, or importing a digital certificate. In an embodiment, the certificate management service provides a command line interface ("CLI") that allows for digital-certificate and certificate-authority operations to be performed via a text-based interactive console or a programmatic script.

In an embodiment, a Hosted Private Certificate Authority ("HPCA") is provided. An HPCA is a hosted certificate authority service which allows enterprises and Internet of things ("IoT") customers to create a private CA using, in some embodiments, a computing resource service provider to do the work of creating, managing and securing certificate authority certificates, private certificates, and real-time services that vend certificate state. By using a PCA hosted by a service provider, in various embodiments, customers are provided with security, configuration, management, and monitoring of a high-availability PCA, without hiring a security and maintenance team. In an embodiment, an HPCA is provided as a feature of a Certificate Manager which is also provided by the computing resource service provider. In an embodiment, the HPCA allows customers to manage their certificates from a console, and perform operations such as creating, rotating, and revoking both public and private certificates. In an embodiment, the certificate management service manages certificate renewal for certificates controlled by the customer including private certificates issued by the HPCA. By providing managed certificate renewal, the certificate management service is able to reduce outages caused by certificate expiration. In an embodiment, customers may use the HPCA to deploy private certificates on various computing resources provided by the CRSP, including load balancers, content delivery networks ("CDNs"), and application programming interface Gateway endpoints. In an embodiment, customers can export private certificates from the HPCA and deploy them on other services and endpoints not associated with the CRSP.

In an embodiment, the certificate management service, in coordination with the private certificate authority ("CM/PCA") is a managed service that helps customers manage the lifecycle of their digital certificates and private certificate authorities. In an embodiment, the CM/PCA provides the customer with a high-availability private CA service without the upfront investment and ongoing maintenance costs of implementing and operating their own private CA. In an embodiment, CM/PCA extends certificate management capabilities to both public and private certificates, allowing the customer to manage public and private certificates centrally. In an embodiment, the certificate management service renews customer private certificates automatically. In an embodiment, the customer can create and deploy private certificates for other resources of the CRSP using the certificate management service or using an API provided by the certificate management service. In an embodiment, CM/PCA allows developers to be more productive by providing them with APIs that create and deploy private certificates programmatically. In an embodiment, the certificate management service provides the ability to create private certificates for applications that require custom certificate lifetimes or resource names. In an embodiment, CM/PCA allows the customer to create and manage private certificates for their connected resources in one place with a secure, pay as you go, managed private CA service.

In an embodiment, CM/PCA provides the customer with a private CA service. In an embodiment, the addition of PCA management functions to the certificate management service extends the certificate management service's certificate management capabilities to private certificates, enabling the customer to manage public and private certificates centrally and have the certificate management service renew the private certificates of the customer. In an embodiment, the customer is able to create and deploy private certificates for resources of the computing resource service provider using a management console or an application programming interface provided by the certificate management service. In an embodiment, the certificate management service provides a common tool for both creating and managing a CA, and for creating and managing public and private certificates. For example, a customer can create an online private CA, and from the same console, create and deploy certificates issued from their online private CA.

In an embodiment, the PCA is implemented with one or more hardware security modules ("HSMs") (such as a cloud-based HSM) that retain keys and perform cryptographic functions related to the creation, renewal, and management of digital certificates. In an embodiment, a set of cryptographic keys used by the PCA is stored in an HSM. In an embodiment, the set of cryptographic keys is encrypted with a master key maintained in the HSM, and the resulting encrypted set of cryptographic keys can be exported, allowing the HSM to be reallocated by the computing resource service provider for other uses. In an embodiment, if the PCA needs to use the set of cryptographic keys, the PCA can provide the encrypted set of keys to the HSM (or another HSM having the master key), and the HSM can decrypt and restore the set of cryptographic keys. In this way, a large number of PCAs can be deployed by the computing resource service provider with a limited number of HSM's, resulting in a lower cost solution for the customer.

In an embodiment, the system provides templates for use in generating and managing digital certificates. In an embodiment, templates are resources for defining policy rules and settings for certificates issued by a private CA. In an embodiment, the customer, acting as the administrator of a Private CA may create and use templates to control the information included in the certificates issued by their CAs. In an embodiment, the administrator uses templates to set policy rules for their CAs and default settings for the certificates issued by their CAs. In an embodiment, the customer/administrator can control what information does or does not go into certificates and can create rules for rejecting certificate requests that don't follow the rules.

In an embodiment, users that want a private CA-issued certificate may be required to specify a template when making a certificate request. In an embodiment, when a user requests a certificate, the user must specify a template which determines the rules and settings for that certificate. In an embodiment, the private CA service processes rules and settings from the template when processing incoming certificate requests. In an embodiment, the private CA service may modify the request and pass it on to be issued, pass it on unmodified, or reject the request, depending on the contents of the request and of the template.

In an embodiment, the customer can enable cross-account resource sharing by authorizing other accounts of the CRSP to use the customer's PCA instance. In an embodiment, the customer may obtain the status of the PCA though the certificate management service using an implementation of the online certificate status protocol ("OCSP"). In an embodiment, the certificate management service allows the customer to create templates for CA and client certificates. For example, in an embodiment, customers can customize x509v3 certificate extensions or the contents of certificate extensions. In an embodiment, the certificate management service allows the customer to manage approval workflows for the issuing certificate (Registration Authority ("RA") integration). In an embodiment, the certificate management service supports virtual private network endpoints for PCA public APIs.

In an embodiment, PCA provides improved security by carefully managing how the private key for the CA is generated and protected, and how access to the private key is controlled. In an embodiment, the system takes additional steps to secure the workflows and prevent unauthorized issuance by using signing keys at each step of the workflow.

As one skilled in the art will appreciate in light of this disclosure, certain embodiments may be capable of achieving certain advantages, including some or all of the following: (1) providing increased security to customers by replacing self-signed certificates with certificates issued by a private certificate authority, (2) reducing the cost and maintenance associated with operating a private certificate authority, and (3) simplifying the management of digital certificates by providing a single console that can be used to manage both public certificates issued by public certificate authorities and private certificates issued by private certificate authorities.

The advantages of an embodiment of the CM/PCA can be described by way of the following example. In the following example, Alex is an external customer. Alex wants to issue private certificates. The CM/PCA simplifies this process by allowing Alex to create a new Private CA which is managed by a computing resource service provider. Alex can manage access to the CA and issue and revoke certificates without needing to operate or maintain the associated infrastructure. In an embodiment, Alex need not worry about certificate expirations because the certificate management service takes care of certificate renewals automatically. In an embodiment, Alex can create a subordinate CA or a root CA. In an embodiment, the PCA provides Alex with visibility on how the private key for her CA is being used via system logs. In an embodiment, the PCA can also generate an audit report that shows the certificates issued from a CA. In an embodiment, Alex can also create public certificates and manage them in the same console as her private certificates.

FIG. 1 illustrates an example of a system 100 that includes a certificate management server that manages digital certificates issued by a plurality of certificate authorities, in an embodiment. In an embodiment, the certificate management server 102 may be a computer server, server cluster, virtual computer system, application runtime, serverless execution environment, or computing appliance configured to execute a set of executable instructions that, as a result of being executed by one or more processors of the certificate management server 102, cause the certificate management server 102 to implement a certificate management service.

In an embodiment, the certificate management server 102 provides an interface that allows the user 106 to access the certificate management server 102 via a client computer system 104. In an embodiment, the client computer system 104 may be a personal computer system, laptop computer system, cell phone, handheld device, tablet computer system, a thin client computer system, or computing device. In an embodiment, the client computer system 104 hosts an application made up of executable instructions stored on a memory of the client computer system that, when executed by a processor on the client computer system 104, cause the client computer system 104 to communicate with the certificate management server 102 in accordance with the interface. In an embodiment, the user 106 obtains the status of the private certificate authority though the certificate management service using an implementation of the online certificate status protocol.

In an embodiment, the certificate management server 102 implements a Web server that serves a set of webpages that can be downloaded to the client computer system 104. In an embodiment, the set of webpages are received by the client computer system 104 and rendered on a display using a browser hosted by the client computer system. In an embodiment, the web pages cause the client computer system 104 to display the user interface for the certificate management service. In an embodiment, the webpages include interactive forms that allow the user 106 to enter information associated with the creation and management of private certificate authorities and the management of digital certificates.

In an embodiment, the certificate management server 102 provides certificate management services to a multitude of customers and users. In an embodiment, individual customers and/or users may create and control distinct sets of certificate authorities and digital certificates. In an embodiment, individual users from different businesses may use the certificate management server 102 to generate separate private certificate authorities to generate digital certificates for their different businesses. In an embodiment, individual department heads within a business may use the certificate management server 102 to generate separate private certificate authorities to secure digital entities within their respective departments. In an embodiment, the user 106 can enable cross-account resource sharing by authorizing other users of the CRSP to use the user's private certificate authorities or digital certificates.

In an embodiment, the certificate management server 102 manages certificates from a plurality of certificate authorities. In an embodiment, the certificate management server 102 interacts with the first private certificate authority 108, second private certificate authority 110, and a public certificate authority 112. In an embodiment, the private certificate authorities may be certificate authorities created by the certificate management server 102. In an embodiment, the public certificate authority 112 is a public certificate authority that issue certificates managed by the certificate management server 102. In an embodiment, the certificate management server may generate private certificate authorities for multiple customers that may or may not be part of a shared signing chain. In an embodiment, the certificate management server performs certificate operations with the first private certificate authority 108 and the second private certificate authority 110 using an application programming interface provided by the respective certificate authorities. In an embodiment, the certificate management server 102 performs certificate management operations with a public certificate authority 112 by submitting certificate signing requests "CSRs" to the public certificate authority 112 on behalf of the user 106.

In an embodiment, the certificate management service allows the customer to manage approval workflows for the issuing certificate (Registration Authority ("RA") integration). In an embodiment, the certificate management service supports virtual private network endpoints for private certificate authority public APIs.

In an embodiment, the certificate management server 102 establishes a certificate management data store 114. In an embodiment, the certificate management data store 114 stores information relating to the certificate authorities and certificates being managed by the certificate management server 102. In an embodiment, for each private certificate authority, the certificate management data store 114 records the owner of the certificate authority, identifying information for the certificate authority, templates associated with the certificate authority, and certificates issued by the certificate authority. In an embodiment, for each digital certificate managed by the certificate management server 102, the certificate management data store 114 records the certificate authority that issued the digital certificate, the entity using the digital certificate, and expiration information associated with the digital certificate. In an embodiment, the certificate management data store 114 records a template used to create each digital certificate.

In an embodiment, a certificate authority is an entity that provides digital certificates which may be used to cryptographically verify the identity of the entity to which the digital certificate is issued. In an embodiment, the certificate authority controls a public-private key pair. In an embodiment, when the certificate authority receives a request for digital certificate from a requester, the certificate authority confirms the information provided by the requester and generates a digital certificate in accordance with the rights of the requester to generate digital certificates. In an embodiment, the certificate authority signs the digital certificate with the private key of the certificate authority. In an embodiment, by confirming the digital signature on the digital certificate with the public key of the certificate authority, and by confirming a digital signature of a purported entity with a public key in the digital certificate, the identity of the purported entity can be confirmed to be that which is represented in the digital certificate (to the extent that the certificate authority is trusted).

In an embodiment, a digital certificate is generated by an entity. In an embodiment, the entity generates a public-private key pair and includes the public key with a digital certificate. In an embodiment, the digital certificate includes other identifying information such as the name, address, or uniform resource locator ("URL") of the entity. In an embodiment, the entity signs the digital certificate with the private key, thereby creating a self-signed certificate, or the digital certificate is signed by a trusted third-party that confirms the information in the certificate. In an embodiment, the entity may then prove its identity by providing the certificate to another party, and by signing a request, message or other piece of data with its private key. In an embodiment, a recipient uses the public key in the provided certificate to confirm the signature, thereby verifying that the request, message or other piece of data was in fact signed by the owner of the private key (the entity indicated in the certificate). In an embodiment, if the certificate is signed by a trusted third party, the verifying entity can be cryptographically assured that the trusted third-party has confirmed that the identity in the certificate is correct.

In an embodiment, a CA issues a certificate by validating that a public key belongs to a named resource such as a server, creating a certificate containing both the name and the public key, and digitally signing the certificate to assert that the public key belongs to the resource. In an embodiment, a CA issues a certificate to identify a host by signing a certificate request provided by an authorized requester. In an embodiment, once issued, the host may present the certificate to other hosts as proof of its identity. In an embodiment, a host is said to trust a CA if the CA's certificate is represented in a database of trusted CAs maintained by the host, often referred to as a trust store. In an embodiment, a trust store is a list of trusted CA certificates stored by the host's operating system or by one or more applications on the host computer system. In an embodiment, a trust store may be maintained by a web browser or a web server that is running on the host. In an embodiment, applications on the host may access a trust store maintained and stored by the operating system of the host. In an embodiment, because certificates may be used as a basis of trust and identity for many applications, it is important that CAs be operated securely and only issue certificates when authorized to do so. In an embodiment, revocation is provided as an additional CA function. In an embodiment, revoking a certificate distrusts the certificate and communicates to clients and other relying parties that the certificate is no longer trusted. For example, a certificate identifying a host can be revoked if the host is compromised. In an embodiment, when a certificate of a host is revoked, applications that rely on the certificate stop trusting the host as a result. Collectively, this system of establishing trust based on CAs, certificates, and public key cryptography is known as public key infrastructure ("PKI").

In an embodiment, the certificate management service is a set of executable instructions stored in a memory on a computer system operated by the computing resource service provider. As a result of executing the set of executable instructions on one or more processors of the computer system, the executable instructions cause the computer system to perform the operations described herein that are attributable to the certificate management service. In various embodiments, operations attributed to the certificate management service include transmitting webpages over a computer network, when the instructions are processed by a browser on the client computer system operated by a customer, cause a user interface to be presented to the customer. In an embodiment, the executable instructions cause information to be exchanged between the computer system operated by the computing resource service provider and the client computer system. In an embodiment, the information includes instructions and parameters that cause the computer system to generate and manage digital certificates, and interact with both public and private certificate authorities.

Figure 2:
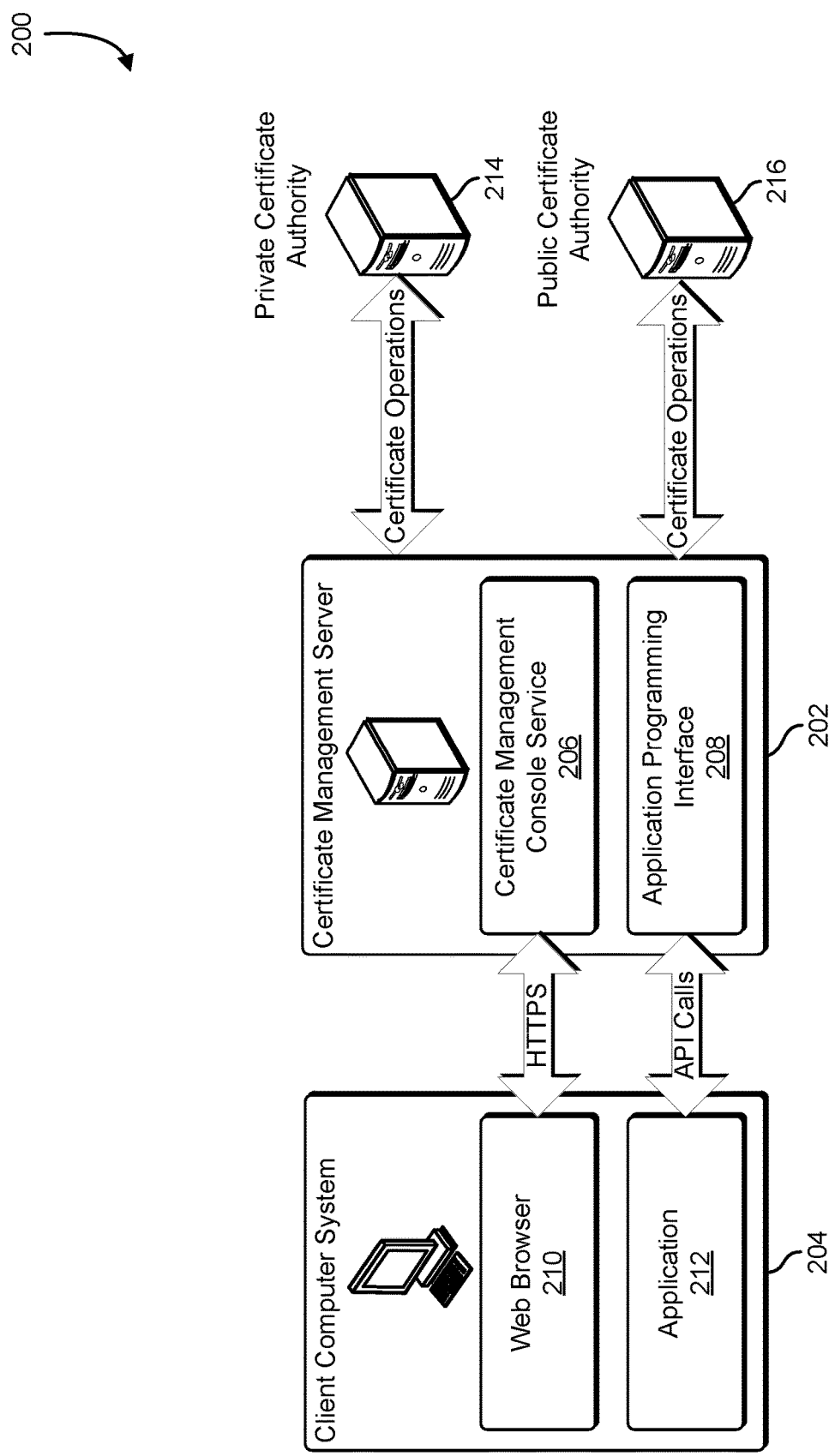
FIG. 2 illustrates an example of a certificate management server that performs certificate management operations using both private and public certificate authorities, in an embodiment.

FIG. 2 illustrates an example of a system 200 that includes a certificate management server 202 that performs certificate management operations using both private and public certificate authorities, in an embodiment. In an embodiment, the certificate management server 202 provides certificate management services to a client computer system 204. The certificate management server 202 may be a server computer system, server cluster, virtual computer system, computer runtime, or computing appliance having one or more processors and physical computer-readable memory storing instructions that, as a result of being executed by the one or more processors, implement a certificate management console service 206 and an application programming interface 208. In an embodiment, the certificate management console service 206 and the application programming interface 208 are comprised of executable instructions stored on the memory of the certificate management server 202. In the present document, when reference is made to a service or software component performing a particular function or operating in a certain way, it is understood that the instructions associated with the service or component are executed by a processor on a computer system that hosts the service or software component, thereby causing the computer system to perform the recited function or operation.

In an embodiment, the certificate management console service 206 provides a Web server with a collection of webpages that can be served to the client computer system 204 over a network. In an embodiment, when rendered on a web browser 210 the webpages provide a graphical user interface for performing various certificate management functions. In an embodiment, certificate management functions may include certificate revocation, certificate generation, certificate renewal, and the exporting and importing of digital certificates and cryptographic keys.

In an embodiment, the application programming interface 208 provides an application 212 hosted by the client computer system 204 with the ability to perform certificate management operations programmatically using a network call. In an embodiment, the certificate management server 202 provides a command line interface that is used interactively by the user or, in some embodiments, programmatically by an application. In an embodiment, the command line interface supports a scripting language that is used to automate complex certificate management tasks. In an embodiment, the client computer system 204 may be a personal computer system, server computer system, virtual computer system, notebook computer system, tablet computer system, cell phone, wearable device, or appliance. In an embodiment, the application 212 is a set of instructions deployed by a customer and hosted by the client computer system 204. In an embodiment, API calls are transmitted to the certificate management server over secure socket layer/transport layer security ("SSL/TLS") network connection. In an embodiment, API calls are authenticated using a digital signature generated with a cryptographic key accessible to the application 212. In an embodiment, an API call is generated by generating a request and adding a timestamp to the request. The resulting request is signed using the cryptographic key and provided to the certificate management server 202. In an embodiment, the request is valid for a threshold amount of time from the timestamp on the request, after which the request is no longer valid.

In an embodiment, the certificate management server 202 performs operations with a private certificate authority 214 and a public certificate authority 216. In an embodiment, the certificate management server 202 is capable of allocating computing resources and configuring those resources to implement the private certificate authority 214 in accordance with the request received from the client computer system 204. In an embodiment, the certificate management server 202 performs certificate operations using the private certificate authority 214 including certificate generation, certificate revocation, and certificate renewal.

Figure 3:
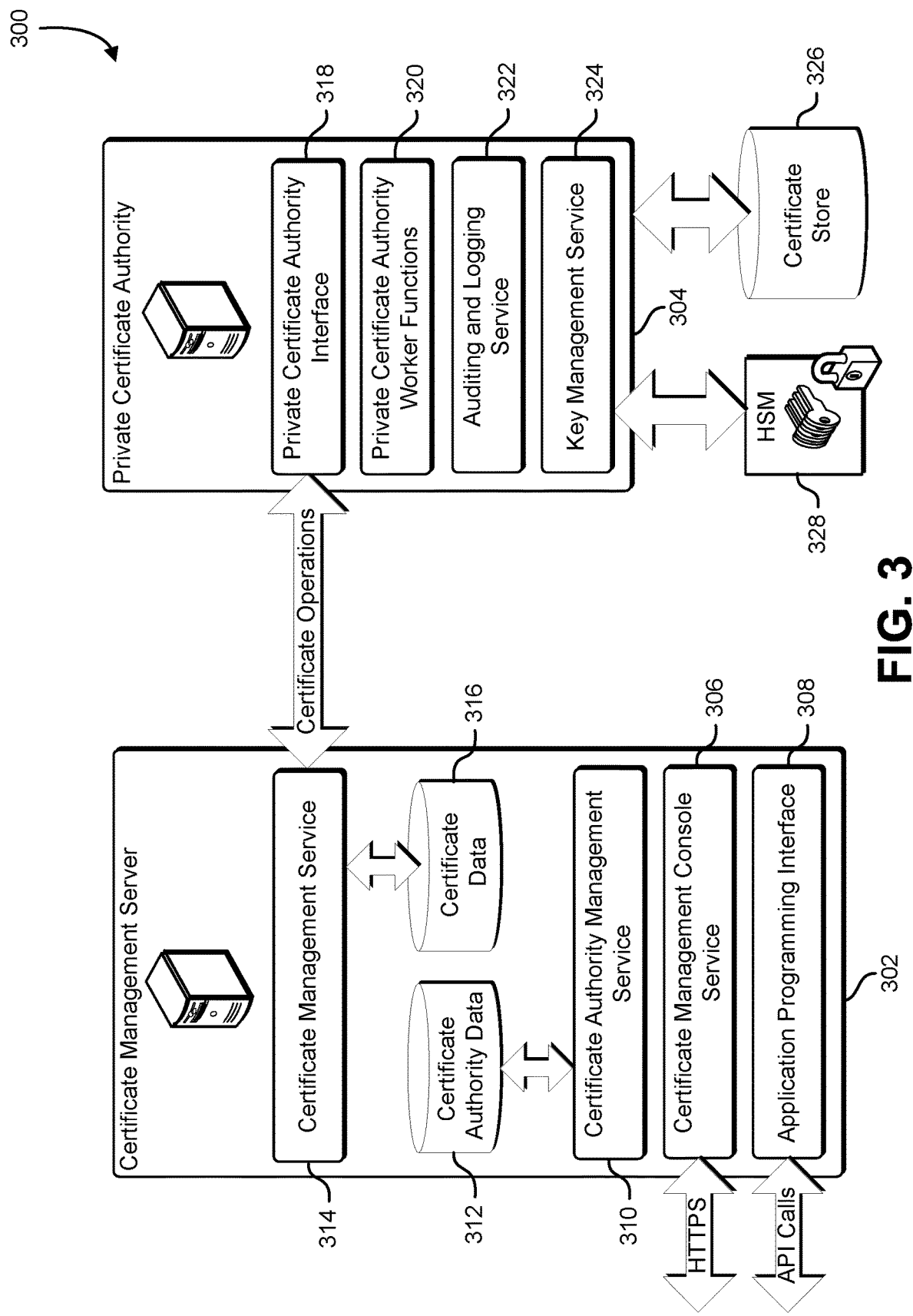
FIG. 3 illustrates an example of a certificate management server and a private certificate authority, in an embodiment.

FIG. 3 illustrates an example of a system 300 that includes a certificate management server 302 and a private certificate authority 304, in an embodiment. In an embodiment, the system includes a certificate management server 302 and a private certificate authority 304. In an embodiment, the certificate management server 302 includes a certificate management console service 306 and an application programming interface 308 as described above and illustrated in FIG. 2.

In an embodiment, the certificate management server includes certificate authority management service 310. In an embodiment, the certificate authority management service 310 maintains a certificate authority data store 312 that contains information associated with public and private certificate authorities being managed by the certificate management server 302. In an embodiment, the certificate authority data store 312 includes a name, digital certificate, networking information, credentials, and cryptographic keys associated with each certificate authority. In an embodiment, the certificate authority data store 312 may be used to store the certificate authority information shown in FIGS. 5 through 10. In an embodiment, the certificate authority data store 312 includes information identifying the computing resources used to generate a private certificate authority. In an embodiment, the certificate authority data store 312 includes encrypted versions of cryptographic keys that, when transferred to a hardware security module containing an appropriate cryptographic key, enable the hardware security module to access the cryptographic keys and perform certificate signing operations on certificates of the private certificate authority. In an embodiment, customer certificate authority objects are stored in the certificate authority data store 312. In an embodiment, some of the customer data, such as the certificate signing request, certificate, subject info etc., is stored in the database and encrypted with cryptographic keys using an encryption library to encrypt data at rest.

In an embodiment, the certificate management server 302 includes a certificate management service 314 and a certificate data store 316. In an embodiment, the certificate management service 314 interacts with the private certificate authority 304 to perform certificate operations. In an embodiment, certificate operations may include certificate renewal, certificate revocation, and certificate signing. In an embodiment, the certificate management service 314 accesses the private certificate authority 304 by way of a private certificate authority interface 318 hosted by the private certificate authority 304. In an embodiment, the private certificate authority interface 318 is an application programming interface.

In an embodiment, the private certificate authority 304 performs various certificate operations using a set of private certificate authority worker functions 320. In an embodiment, the private certificate authority interface 318 services API requests and is hosted on a virtual machine instance. In an embodiment, Read APIs such as DescribeCA, GetCertificate, etc. are synchronous calls. In an embodiment, the read APIs are handled by retrieving the data from the database and returning the same to the customer. In an embodiment, write APIs such as CreateCA, IssueCertificate, and RevokeCertificate, are asynchronous calls that can take from a few seconds to a few days to complete. In an embodiment, these APIs are handled by generating an ARN, then initiating a workflow to process the request before returning the ARN to the customer.

In an embodiment, the PrivateCA KeyGen is a cron Job that runs every one hour to generate signing keys. In an embodiment, these keys may be used by other PrivateCA components to establish secure communications between various components, to sign wireprotocol messages, and to verify that any incoming messages are generated at the correct source. In an embodiment, this prevents a bad actor from injecting rogue workflows into the PCA system.

In an embodiment, workflows are implemented using Step Functions ("SFN"). PCA StepFunction workers regularly poll SFN for any tasks, creating unsigned CSR objects, and creating a to-be-signed certificate. In an embodiment, the system uses a polling process where an HTTP socket is opened for 60 seconds, which listens for any available messages. In an embodiment, if no messages are available, it will again check for work after an amount of time. In an embodiment, if there is work available, PCA step function workers ("SFW") start the execution.

In an embodiment, the private certificate authority 304 includes an auditing and logging service 322. In an embodiment, the auditing and logging service 322 records when certificates are issued, revoked, and when sensitive cryptographic keys are used to sign digital certificates. In an embodiment, a PrivateCA Signature generator is provided. In an embodiment, a hardware security module ("HSM") 328 may be used to secure the cryptographic keys.

1. The signature generator interacts with SFWs.
2. A per CA public/private key pair is generated by an HSM and the private key is used to sign CA objects such as CSR, Certificates, CRLs, etc. HSM access credentials are encrypted using a key management service 324 and stored. The signature generator has permissions to this key and hence to these credentials.
3. In some implementations, the signature generator service and the HSM are deployed in peered virtual networks.

In an embodiment, the signature generator logs operations performed such as creating an asymmetric key pair, signing, etc. into a database table, which is consumed by an HSM Auditor to compare and validate HSM logs. In an embodiment, the Auditor looks at the logs in the table and the actions performed in the HSM using the HSM logs to make sure they are in sync. In an embodiment, in the event that the logs in the table and the actions performed in the HSM do not match, the Auditor raises a flag to trigger additional investigation. HSMs can be provided as individual HSM instances or as HSM clusters. An HSM cluster can be created in two ways:

1. New cluster: To create a new cluster, a unique wrapping key is created for the cluster, which never leaves the HSMs. This wrapping key is used to encrypt CA private keys so that the encrypted private key can be exported and stored outside the HSM. The very first HSM cluster within an HSM group will be created this way.
2. From HSM backup: In this case, the original HSM cluster and the newly created HSM cluster will have the same wrapping key. This allows additional capacity to be added for a given HSM group by creating additional HSM cluster(s).

In an embodiment, the PCA has a single HSM cluster (per region). Each cluster may be, by itself, an entity that spans multiple AZs but exists in a single region. In an embodiment, when creating the new HSM cluster, the following steps are taken:

1. Zeroing both the HSM itself and the HSM partition.
2. Creating all security officer accounts and configuring the HSM for 2-factor m-of-n authentication.
3. Creating the credential for programmatic access.
4. Creating a new wrapping key for CA key exporting. The wrapping key itself will not be exportable.
5. Making a backup of this newly minted HSM and storing this. HSM backup is encrypted.

For programmatic access, the signature generator hosts will have the HSM client installed on them. In an embodiment, the authentication username and password will be encrypted via KMS and stored in a database. In an embodiment, the ability to decrypt this credential is controlled by the policy on the encryption key in KMS. In an embodiment, for administrative access, operations will be performed by the HSM utilities directly, which will require a quorum of m security officers out of n. In an embodiment, the main operation that will be done administratively is creating a new HSM cluster and initializing it, or destroying an HSM cluster.

In an embodiment, requests are signed, and the signatures on the requests are used to perform authentication and authorization checks.

In an embodiment, both customer objects and PCA objects are encrypted using a key management service. In an embodiment, access to keys is managed by PCA via the key management service key policy and grants. In an embodiment, there are two types of keys: storage keys and internal keys. In an embodiment, storage keys are used to protect customer data at rest. In an embodiment, internal keys are used to protect PCA related resources and communication between components, e.g., to initiate different workflows.

In some embodiments, the PCA uses Step Functions (SFN) to orchestrate workflow management. SFN workers sign the request data with their respective private keys as they process the request. In an embodiment, each worker validates that the request data was signed by trusted workers using workers trusted public keys. In an embodiment, the workers' private keys themselves are encrypted with an internal key and stored in a data store.

In an embodiment, customer objects such as CSRs, certificates, templates, etc. containing potentially sensitive data, are encrypted with a storage key and stored in a certificate store 326. In an embodiment, each storage key is a unique data key per CA that is encrypted with a key management service CMK in the PCA account.

Access to various PCA resources is controlled via security roles. Each worker will have its own role so that a worker can be granted access only to the resource that it needs instead of giving broad access to numerous PCA resources.

In an embodiment, the automatic operations the HSM can perform may be limited to the following:

1. Create a new key pair (RSA or ECC)
2. Sign an ASN1 object, e.g., certificate, CSR, CRL, or OCSP response
3. Wrap a key (encrypt a private key using a symmetric key inside the HSM)
4. Unwrap a key (decrypt an encrypted private key using the same symmetric key in the HSM)

In an embodiment, operations such as backup, adding or removing a cluster may be handled by an HSM, or done manually using the HSM CLI via certificate management services.

Figure 4:
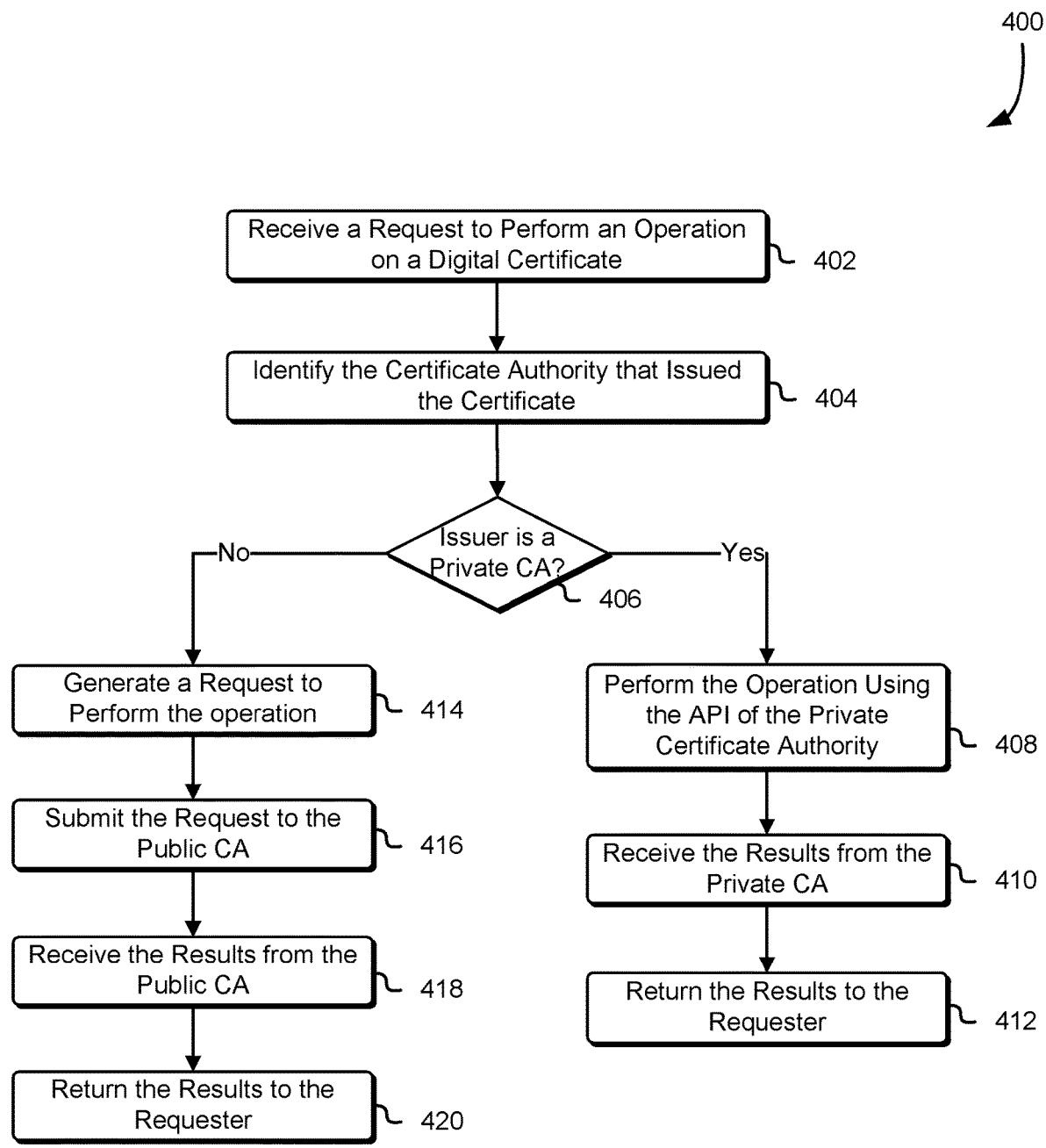
FIG. 4 illustrates an example of a process that, as a result of being performed by a certificate management server, performs a certificate management operation using a certificate authority, in an embodiment.

FIG. 4 illustrates an example of a process 400 that, as a result of being performed by a certificate management server, performs a certificate management operation using a certificate authority, in an embodiment. In an embodiment, the process begins at block 402 with a certificate management server receiving a request to perform the operation of a digital certificate. In an embodiment, the request may be received via an application programming interface, a fillable form on a webpage, or command line interface. In an embodiment, at block 404, the certificate management server examines the request and identifies certificate authority that issued the certificate. In an embodiment, the certificate management server uses a database of certificate authority and certificate information to identify the certificate authority associated with the digital certificate. In an embodiment, the certificate management server uses information in the request to identify the certificate authority. In an embodiment, the certificate management server examines subject information in the digital certificate and uses the database of certificate authority information to locate a certificate authority responsible for issuing certificates having matching subject information.

In an embodiment, at decision block 406, if the certificate management server determines that the certificate authority is a private certificate authority managed by the certificate management server, execution advances to block 408. In an embodiment, at block 408, the certificate management server performs the operations using the private certificate authority. In an embodiment, the private certificate authority provides an application programming interface that the certificate management server is allowed to use to perform the operation. In an embodiment, at block 410, the certificate management server receives the results of the operation from the private certificate authority, and at block 412, returns the results to the requester.

In an embodiment, if the certificate management server determines that the certificate authority is a public certificate authority not managed by the certificate management server, execution advances to block 414. In an embodiment, at block 414, the certificate management server generates a request to perform the operation. In an embodiment, the request takes the form of a certificate signing request ("CSR"). In an embodiment, a certificate signing request is a message sent from an applicant to a certificate authority in order to apply for a digital identity certificate. In an embodiment, the certificate signing request contains a public key for which the certificate to be issued, identifying information (subject), and a digital signature. In an embodiment, the certificate signing request is a PKCS#10 or a signed public key and challenge ("SPKAC") formatted certificate signing request. In an embodiment, at block 416, the certificate management server submits the certificate signing request to the public certificate authority. In an embodiment, at block 418, the certificate management server receives the results from the public certificate authority, and returns 420 the results to the requester.

Figure 5:
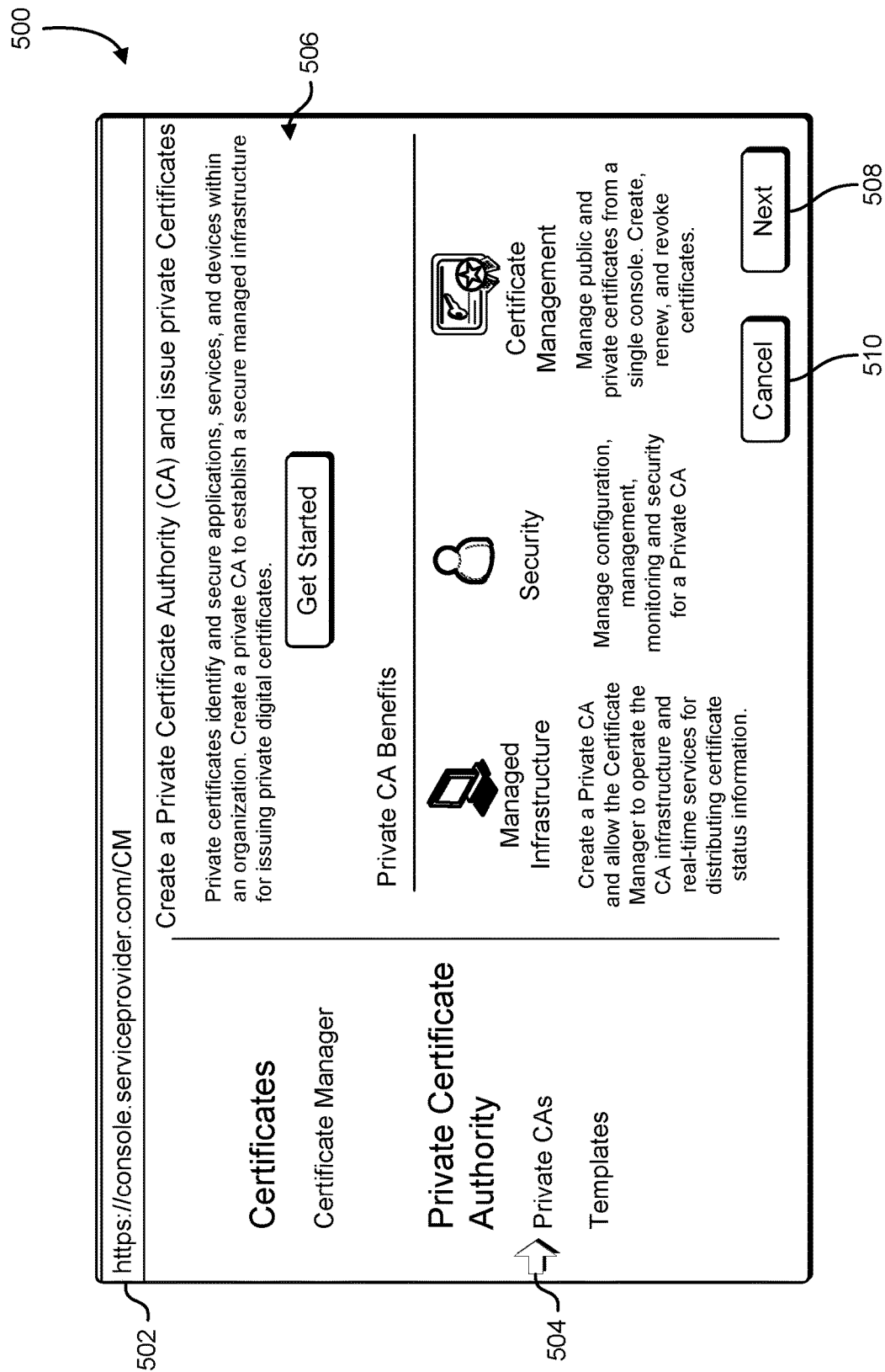
FIG. 5 illustrates an example of a user interface for creating a private certificate authority, in an embodiment.

FIG. 5 illustrates an example of a user interface 500 for creating a private certificate authority, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 5 allows the operator to begin the process of creating a private certificate authority. In an embodiment, a uniform resource locator ("URL") 502 for the webpage is shown at the top of the display.

In an embodiment, the user interface provides a navigation pane 504 on the left side of the display. In an embodiment, the navigation pane 504 allows the user to select whether they want to create a private certificate authority or create a certificate template. In an embodiment, on the right side of the display, a description area 506 describes the process of creating a private certificate authority, and the advantages thereof. In an embodiment, a "Get Started" button allows the user to begin the process of creating a private certificate authority. In an embodiment, a "Next" button 508 indicates to the certificate management server to present the next dialogue in the process. In an embodiment, a "cancel" button 510 indicates to the certificate management server to abandon the process.

Figure 6:
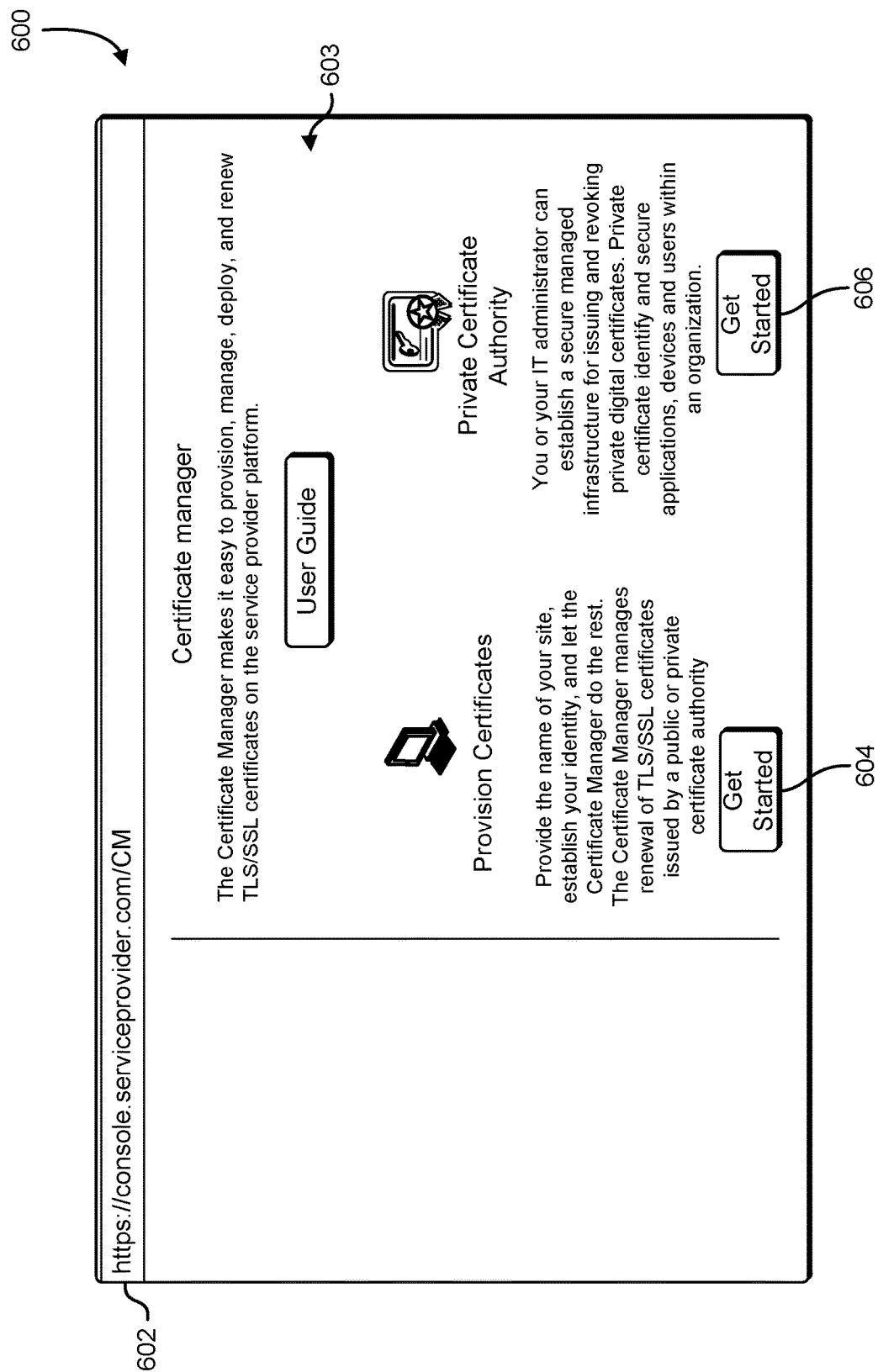
FIG. 6 illustrates an example of a user interface for acquiring a public certificate or creating a private certificate authority, in an embodiment.

FIG. 6 illustrates an example of a user interface 600 for acquiring a public certificate or creating a private certificate authority, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 6 allows the operator to either provision a digital certificate or create a private certificate authority. In an embodiment, a uniform resource locator ("URL") 602 for the webpage is shown at the top of the display.

In an embodiment, the user interface presents three options to the user. In an embodiment, a certificate manager region 603 provides a button that presents documentation describing the operation of the certificate manager and how it can be used to manage digital certificates and create private certificate authorities. In an embodiment, a first get started but 604 begins the process of provisioning a digital certificate. In an embodiment, a second get started button 606 beings the process of creating a private certificate authority.

In an embodiment, the following example illustrates a process used by the certificate management server to create a private certificate authority. In an embodiment, individual steps can be CA operations, which are exposed to customers via APIs:

1. In an embodiment, a customer initiates a request to create a CA either via a PCA Console (as illustrated in FIG. 6) or via an API with at the following inputs: CAType, CA Subject (CA identifier), SigningAlgorithm and optionally RevocationConfig (CRL).
2. In an embodiment, the PCA API sets up a new record in a database with status as CREATING. The API initiates a Step Function ("SFN") workflow for Creating a CA and creates a signed WireProtocol object, which is stored in the database separately. The PCA puts the payload-id associated with this wire protocol message in the Step Functions' JSON input parameters. These are used by the SFN worker to find the WireProtocol contents. SFN then finds the associate CA record based on the CA ARN in the WireProtocol message and decrypts the CA data to process the request.
3. In an embodiment, a signature generator polls the SFN periodically and looks for tasks and starts a workflow to generate a CA keypair when it finds a task.
4. In an embodiment, a PrivateCA Step function workers ("SFWs") polls SFN for tasks such as createCSR, signCSR, createToBeSignedCertificate, etc. Various ASN1 objects, such as the certificate signing request ("CSR"), ToBeSignedCertificates, etc., are created via the PrivateCA SFWs. Once processed, PCA SFW stores the result in the database and returns the response back to the SFN. A Certificate Signing Request is a block of encoded text given to CA when applying for a certificate.
5. In an embodiment, the signature generator uses the CA private key to sign whatever is provided to it. It polls the SFN for new tasks. In this workflow, the task generates a signature for the unsigned CSR object. The signature generator validates the input message using a signing key (Generated by a PCA KeyGen package (described elsewhere in this document)). The signature generator generates the signature using the CA private key and adds it to the original WireProtocol message. Another PCA SFW then takes that signature and incorporates it to a To Be Signed ("TBS") structure to make a signed CSR. At this point, the CA state is changed to PENDING_CERTIFICATE.

6. In an embodiment, the customer then calls the GetCACSR API, signs the CSR using the parent CA, and imports the signed certificate into the PCA using the ImportCACertificate API. Then CA state is changed to ACTIVE.
7. In an embodiment, once a CA is active, it can sign certificates with its private key to assert that the public key in the certificate identifies the person, organization, server or other entity identified in the certificate subject. Applications can use the public key from the trusted CA certificate to verify that the CA signed the certificate.

In an embodiment, the customer generates the CA private key as follows:
1. When the customer calls the CreateCA API, the API initiates a workflow to createCA, as part of which the signature generator polls SFN to look for a task to generate the private key.
2. The signature generator verifies the WireProtocol message signature using signing key and interacts with an HSM client to generate the CA private key based on based on the keytype provided by the customer.
3. The signature generator talks with the datastore via a PrivateCA DAO Layer service to get the rest of the associated data for processing the request. It uses an HSM client to access an HSM for generating the private key. In the end, it exports wrapped keys from the HSM and stores them in the datastore. Later, when the key is needed again for signing, it loads the key into HSM memory.
4. In various embodiments, the PCA supports keytypes: RSA2048, RSA4096, EC p384, and EC p256.

In an embodiment, the customer uses the following process to issue a certificate:
1. In an embodiment, the customer calls IssueCertificate, and passes in a CSR, Signing algorithm, and the CA ARN. The API encrypts CSR using a storage key as described in the CreateCA workflow and puts it into the database.
2. The API creates a WireProtocol message with context fields, stores it in the database, initiates a workflow, and sends a JSON payload including transient payload-id handle (handle to wire protocol in the database), a PrivateCA id and the type of structure to create, in some examples a certificate.
3. The PrivateCA SFW polls SFN looking for new task for createTBSCert. When available, it picks up this task and retrieves data from the database based on passed payload-id and starts the execution. As a response, it creates a TBSCertificate object, stores it in the database and returns the response to SFN.
4. The signature generator polls SFN looking for any new tasks. It receives the task for creating a signature for the TBSCertificate. It talks with the HSM, generates a signature and appends it to the wireprotocol message. The signature generator then stores this updated message into the database and returns a response to the SFN. Another PrivateCA SFW puts together the signature and the TBSCertificate to create the final signed certificate object, which is encrypted using the storage key and stored into the database.
5. Another PrivateCA SFW (called Validator) ensures that the certificate subject, SAN list etc. matches the original CSR requested by the customer, and validates that the Issuer Subject Distinguished Name (DN) in the subscriber certificate matches the subject DN of the CA certificate.

Figure 7:
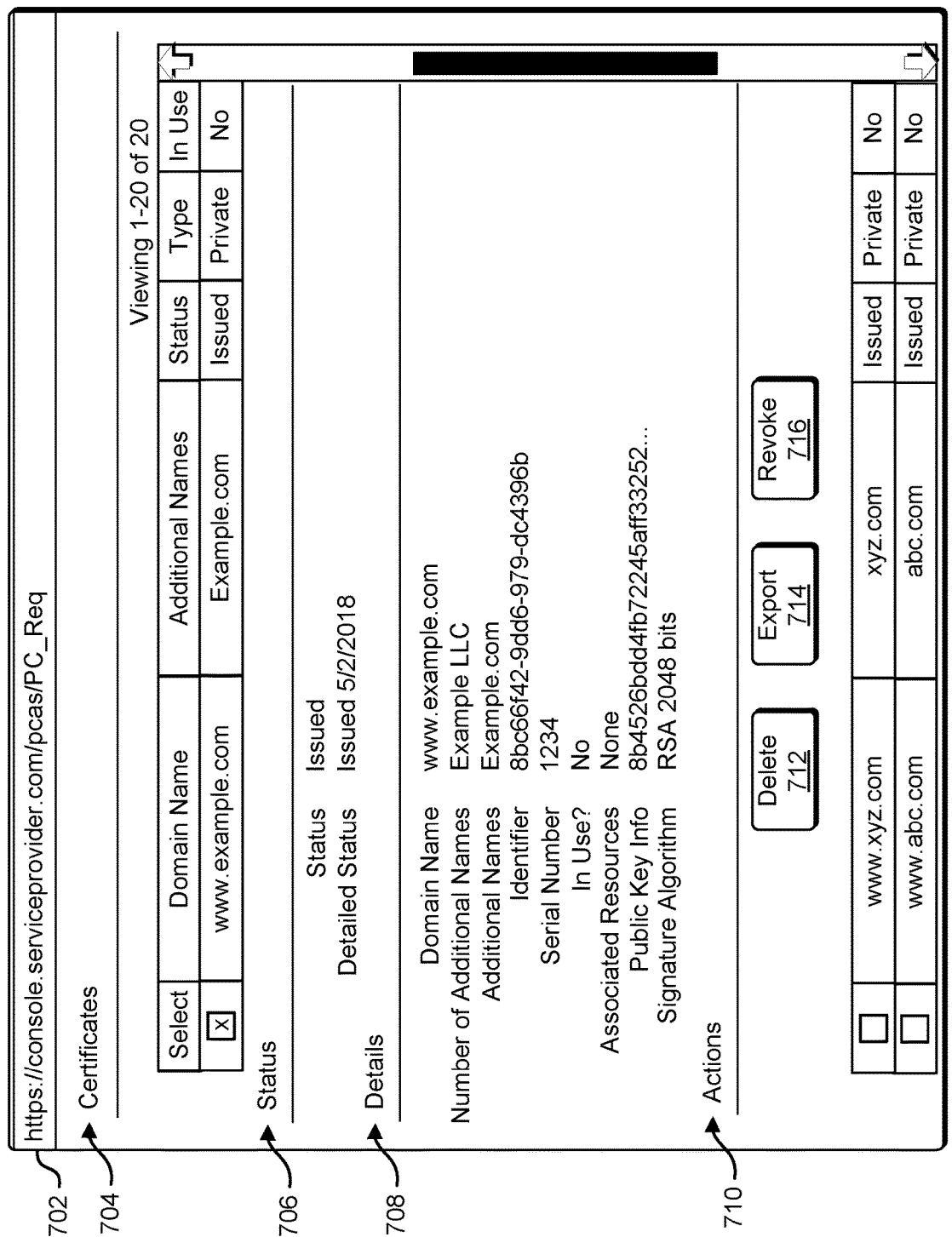
FIG. 7 illustrates an example of a user interface for managing digital certificates, in an embodiment.

FIG. 7 illustrates an example of a user interface 700 for managing digital certificates, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 7 allows the operator to manage digital certificates. In an embodiment, a uniform resource locator ("URL") 702 for the webpage is shown at the top of the display.

In an embodiment, the user interface includes a certificate list 704 that shows the certificates that are being managed by the certificate management server. In an embodiment, the list is scrollable, and individual certificates may be selected with a checkbox on the left-hand side of each row of the list. In an embodiment, selecting a particular certificate expands a space below that row. In an embodiment, the expanded space includes a status area 706, a details area 708, and the action area 710. In an embodiment, the status area 706 shows when the certificate was issued and what its current status is. In an embodiment, the details area 708 shows detailed information about the checked certificate including the domain name, identifier, serial number and so on. In an embodiment, the action area 710 includes three buttons that perform operations on the selected certificate. In an embodiment, the user interface includes a delete button 712 that causes the certificate to be deleted, and export button 714 that causes the certificate to be exported, and a revoke button 716 that causes the certificate to be revoked.

Figure 8:
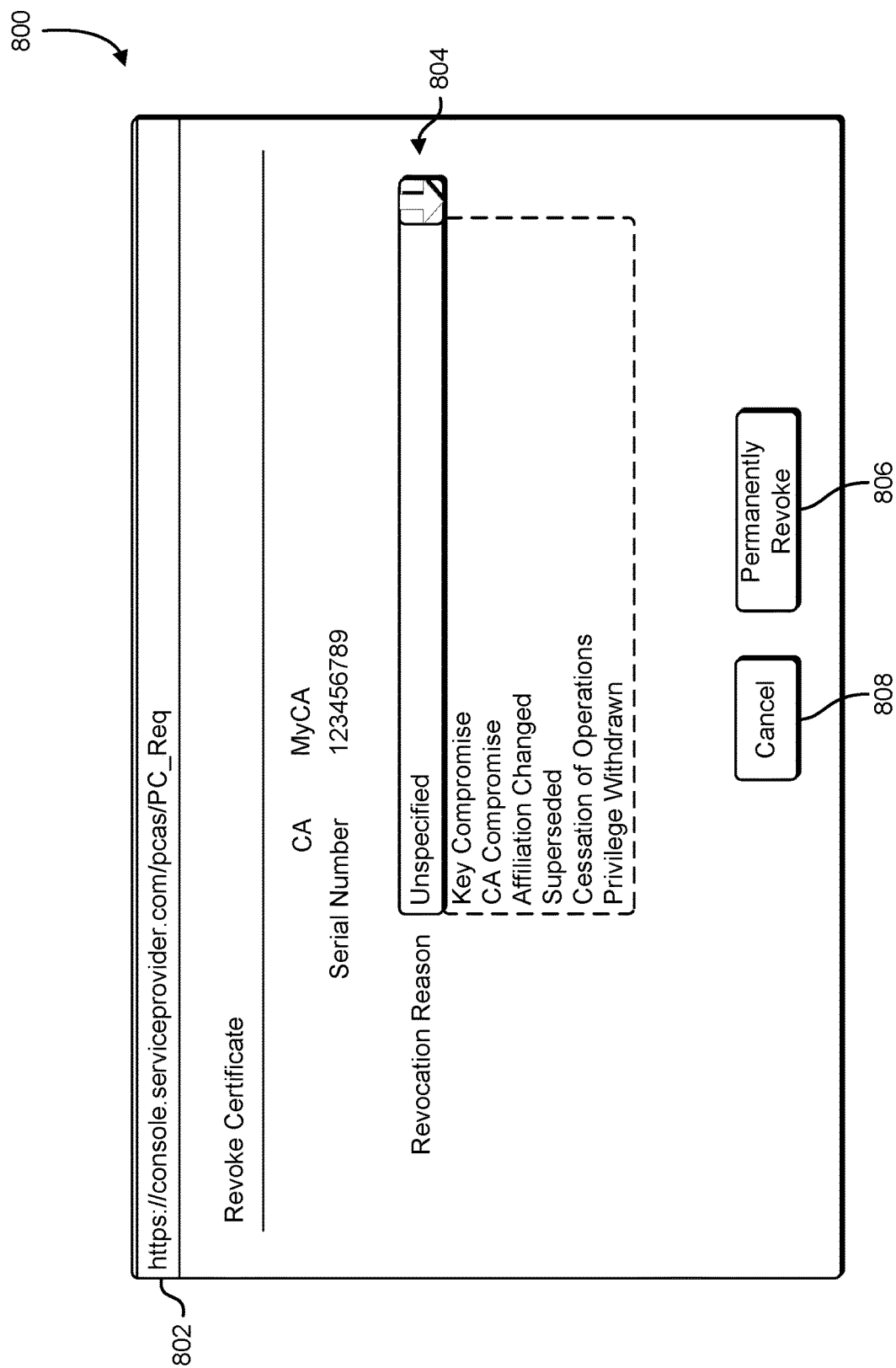
FIG. 8 illustrates an example of a user interface for revoking a digital certificate, in an embodiment.

FIG. 8 illustrates an example of a user interface 800 for revoking a digital certificate, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 8 allows the operator to revoke the digital certificate. In an embodiment, a uniform resource locator ("URL") 802 for the webpage is shown at the top of the display.

In an embodiment, the user interface includes a drop down box 804 that allows the user to select a reason for revoking the certificate. In an embodiment, reasons may include an unspecified reason, a key compromise, a certificate authority compromise, a change of affiliation, the existence of a superseded certificate, the cessation of operations for the owner of the certificate, or a withdrawal of privileges. In an embodiment, the user interface provides a confirmation but 806 of the causes the certificate to be revoked, and a cancel button 808 the aborts the revocation.

In an embodiment, the system includes various revocation infrastructure. In an embodiment, the PCA generates certificate revocation lists. In some embodiments, the system includes OCSP revocation infrastructure. CRL generation occurs via a process that looks at the PCA datastore for revoked certificates and generates a CRL every X days based at least in part on customer parameters provided to the revocation configuration as part of the CreateCA API call. In an embodiment, the certificate management server calls RevokeCertificate, and it triggers the async GenerateCRL job to update the CRL and reflect a newly revoked certificate. In an embodiment, the CRL is stored in a customer data store which is provided as part of the revocation configuration as part of CreateCA API call. The following is a sample revocation configuration:

"RevocationConfiguration":
{
  "CrlConfiguration":
  {
    "Enabled": true,
    "ExpirationInDays": 1,
    "CustomCname": "foo",
    "StorageBucketUrl": "foo"
  }
}

Figure 9:
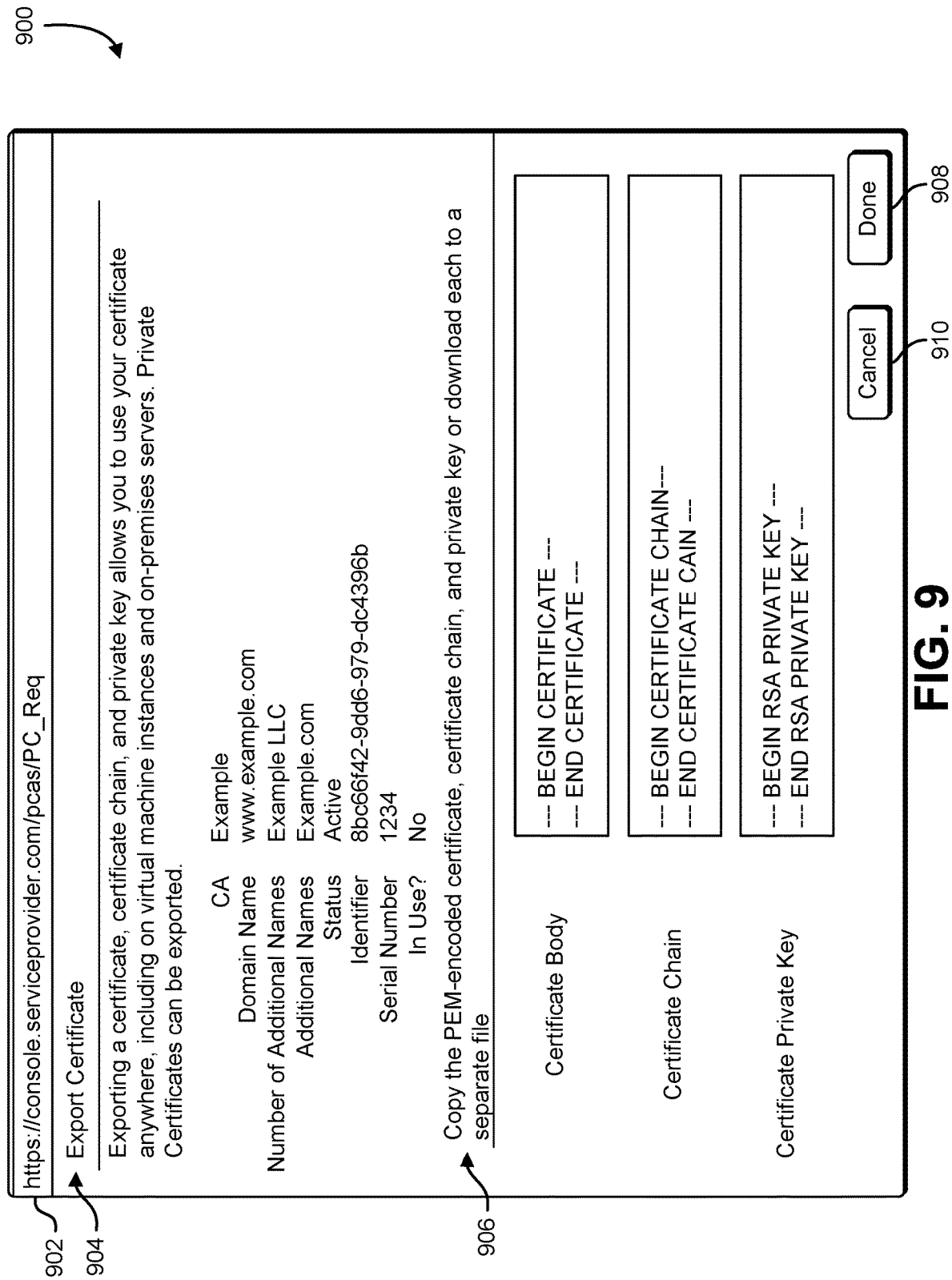
FIG. 9 illustrates an example of a user interface for exporting a digital certificate, in an embodiment.

FIG. 9 illustrates an example of a user interface 900 for exporting a digital certificate, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 9 allows the operator to export a digital certificate. In an embodiment, a uniform resource locator ("URL") 902 for the webpage is shown at the top of the display.

In an embodiment, for the selected digital certificate shown in FIG. 7, the user interface displays detailed information for the selected digital certificate in an informational region 904. In an embodiment, an encoded certificate region 906 provides a PEM-encoded version of the certificate body, the certificate chain, and the certificate private key. In an embodiment, the user may copy or download the encoded certificate information to export it from the certificate management server. In an embodiment, the user interface includes a "done" button 908 that allows the user to complete the process, and a "cancel" button 910 that aborts the certificate export process.

Figure 10:
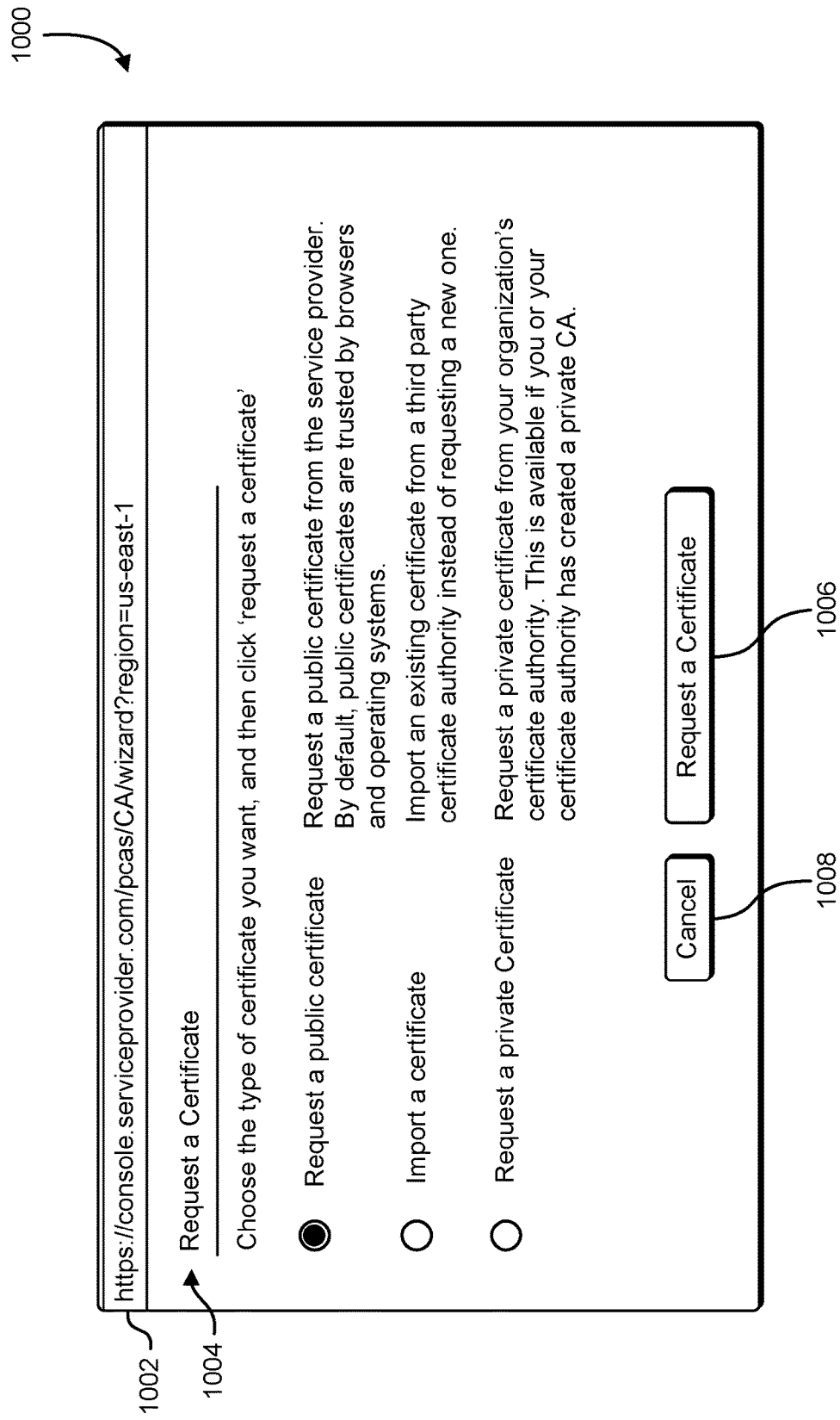
FIG. 10 illustrates an example of a user interface for requesting a digital certificate, in an embodiment.

FIG. 10 illustrates an example of a user interface 1000 for requesting a digital certificate, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 10 allows the operator requested digital certificate. In an embodiment, a uniform resource locator ("URL") 1002 for the webpage is shown at the top of the display.

In an embodiment, a request type selection area 1004 includes three selectable buttons that allow the user to choose the type of digital certificate they would like to request. In an embodiment, the user may request a public certificate, a private certificate, or imported certificate. In an embodiment, a public certificate is provided by the certificate authority operated by the computing resource service provider, and produces a digital certificate that is generally trusted by browsers and operating systems. In an embodiment, a private certificate is issued and signed by a private certificate authority operated by the customer, and is generally not trusted by browsers and operating systems. In an embodiment, the customer may configure their operating systems and browsers to trust a private certificate. In an embodiment, importing a certificate allows a customer to import an existing certificate from an outside certificate authority instead of requesting the creation of a new certificate. In this way, the certificate management service is able to import and manage digital certificates from private certificate authorities, public certificate authorities, and even third-party certificate authorities.

In an embodiment, the user interface includes a "Request a Certificate" button 1006 that allows the user to initiate the process in accordance with the selected certificate type. In an embodiment, the "Cancel" button 1008 allows the user to abort the certificate-request process.

In an embodiment, the system protects the CA private key in various ways. In an embodiment, when private keys are created in the HSM, they will immediately be wrapped and their encrypted form stored in the database. In an embodiment, this key cannot be decrypted by anything but an HSM instance in the same cluster in which it was created, so is generally not accessible outside of an HSM.

In an embodiment, the HSM is accessed by the signature generator (and by a signature generator auditor for verifying HSM logs and corresponding Signature generator operations.), which runs on virtual machine instances within peered virtual networks as HSM instances. In an embodiment, the HSM access credential (user id and password) will be encrypted by the key management system and stored in the database. In an embodiment, the Signature generator service running on the virtual machine instances will need authorization to use the key management system to decrypt the HSM access credential, which is used when making calls to HSM. In an embodiment, in addition to the access credential, access to the HSM will use an additional certificate that allows the HSM client to authenticate to the HSM. In an embodiment, this certificate may be generated via an offline ceremony, encrypted and stored separately from the access credential.

In an embodiment, the PCA uses the key management system to protect customer data. In an embodiment, customer data is envelope-encrypted with a storage key which is generated for each Private CA instance from a CMK owned by the PCA service account. In an embodiment, the encrypted storage key is stored in the database in the PrivateCA table and is passed to DAO calls that support encryption.

In an embodiment, each worker has an associated key pair, which the worker uses to sign and verify the messages before starting any execution. In an embodiment, to guard against rogue workflows, each worker is required to sign the output the worker produces with the worker's private key so that other workers can verify that a worker they trust generated the output. In an embodiment, each worker extracts necessary input that it requires to process the request from a specific worker output.

In an embodiment, the system takes actions to prevent the improper issuance of a certificate. In an embodiment, since issuing a certificate goes through multiple steps (i.e., workflow workers), improperly issuing a certificate either due to a PCA software bug or a rogue actor injecting a request into the workflow is a possible threat to the PCA. Therefore, in an embodiment, each request is validated at every step before it can be processed by any of the components. In an embodiment, without access to the appropriate key management system key, request processing fails. In an embodiment, once the certificate is created, it will be validated using the CA certificate for additional protection.

In an embodiment, the private certificate authority accesses customer master keys ("CMKs") from a key management service. In an embodiment, the CMK is stored in an HSM, and the private certificate authority is provided with information that allows the private certificate authority to use, but not access in plaintext form, the CMK. In an embodiment, the private certificate authority is provided with an encrypted version of the CMK, and provides the encrypted version of the CMK to the HSM which, stores a cryptographic key allowing access to the unencrypted version of the CMK.

In an embodiment, data of the private certificate authority can be generally classified into 3 categories:

private certificate authority internal data (for example: PCA internal public/private keys, etc.)
 Customer data at rest (for example: CSR, Certificates, etc.)
 Customer data in transit. The data is passed around via payload-id, the actual data is stored in a database in encrypted form In an embodiment, access to the data in the PCA as categorized above will be restricted to the users who actually need it and are authorized for it. In an embodiment, the PCA uses a key management service to protect data of the private certificate authority as well as customer data. In an embodiment, the key management service supports two types of keys namely: customer master keys ("CMK") and data keys. In an embodiment, the key management service tracks/stores Master Keys and can encrypt up to 4K bytes of data. In an embodiment, to allow for encrypting larger data objects, the key management service uses envelope encryption by encrypting data with a data key and then encrypting the data key with the master key. In an embodiment, applications store both encrypted data and the encrypted data key. In an embodiment, to decrypt data, applications call the key management service first to decrypt the data key with the master key and then use that data key to decrypt the data.

In an embodiment, workers have access to the public key of the other workers, which individual workers use to verify the signature and authenticity of messages. In an embodiment, once a worker finishes the workflow, it updates the message with the generated output and signs the message using its private key and stores the updated message in a database. In an embodiment, when the next workflow is kicked off, the new worker picks up this message and follows a matching process to verify and sign the message once execution completes.

In an embodiment, the private CA may be used for issuing many types of certificates, including private certificates for TLS, Code Signing, and VPN clients. In an embodiment, certificates and other ASN.1 resources that CAs sign vary in structure and the fields they include. In an embodiment, certificates may or may not include standard extensions such as Subject Alternative Names, and they may or may not include custom extensions defined by customers. In an embodiment, to meet the requirements of being able to sign a wide variety of ASN.1 resources, and to give customers flexibility in what information is included in their private certificates, the system provides a template system that allows the system to control the format and structure of the certificates issued. In an embodiment, templates may be provided to customers, allowing them to control the format and contents of the certificates they issue.

In an embodiment, the system supports the creation of a subordinate CA, generation of a certificate signing request (CSR) for the CA, and importing a CA certificate signed by a parent CA. In an embodiment, the system may supports issuing certificates from the Private CA from a customer-generated certificate request (CSR). In an embodiment, the customer-provided CSR specifies the Subject and Subject Alternative Names, but not Extensions. In an embodiment, the system may also support retrieving (Get) certificates, revoking certificates, generating a certificate revocation lists (CRLs) and depositing them into the a customer's data storage space, generating an audit report showing certificates issued by the CA, requesting certificates from the CA from the certificate management service and using the certificate management service to manage private certificates, DeleteCA, DisableCA, ListCAs, and DescribeCA.

In an embodiment, a computing resource service provider hosts a private certificate authority that can be configured and used by a customer to generate, issue, renew, and revoke private certificates for internal use within the customer's organization. In an embodiment, a private CA is able to manage the issuance, validation and revocation of private certificates within a private network (i.e., not the public internet). The private CA is comprised of a CA certificate (a cryptographic building block upon which certificates can be issued), and a set of run-time services (the Certificate Revocation List) and Online Certificate Status Protocol). In an embodiment, when network entities attempt to connect with one another, the entities check the CRL and OSCP for the status of the certificates that each entity presents. If the certificates are valid, a "handshake" is performed between the resources which cryptographically proves the identity of each entity to the other and creates an encrypted communication channel (TLS/SSL) between them.

In an embodiment, private certificates may be used to identify resources within an organization, such as applications, services, devices and users. For example, in establishing a secure encrypted communications channel, each endpoint may use a certificate and cryptographic techniques to prove its identity to the other endpoint. Internal API endpoints, web servers, VPN users, IoT devices, and many other applications are able to use private certificates to establish encrypted communication channels for their secure operation.

In an embodiment, the private certificate authority is accessible via an application programming interface and is able to be managed by a certificate manager. In an embodiment, the certificate manager is a service operated by the computing resource service provider that allows the customer to provision, manage, and deploy digital certificates for use with various services of the computing resource service provider. For example, the certificate manager may be used to deploy secure sockets layer/transport layer security ("SSL/TLS") certificates that are used to secure network communications and establish the identity of websites over the Internet. By managing digital certificates with the certificate manager, tasks such as certificate renewal, certificate upload, certificate revocation, and certificate purchasing may be handled automatically, or through a simplified certificate manager interface. In some implementations, certificates that are provisioned using the certificate manager are automatically uploaded to other services provided by the computing resource service provider.

In an embodiment, in addition to managing digital certificates issued by public certificate authorities, the certificate manager may be used to acquire and manage digital certificates provided by a private certificate authority. In this way, the certificate manager provides a common administrative interface for the management of both private and public digital certificates.

In an embodiment, enterprises can use private certificates to identify and secure applications, services, devices, and users within their organization. By using private certificates instead of public certificates, enterprises avoid leaking internal information and support customization in ways that public certificates do not allow.

In an embodiment, the private CA is implemented as a hosted certificate authority service. This allows enterprises to create their private CA using hardware and software resources provided by a computing resource service provider. The service provider (by way of the hosted private CA) performs the creating, managing, and securing of root certificates and private certificates. The service provider may also provide services to vend the certificate state. PCA customers are provided with security, configuration, management, and monitoring of a highly available private CA without having to hire a security and maintenance team. Using the Certificate Manager, customers can manage their certificates from a single console including creating, rotating, and revoking both public and private certificates. The certificate manager also manages certificate renewal for customers which helps prevent outages caused by certificate expiration. Customers can easily deploy private certificates on resources provided by the computing resource service provider, such as Elastic Load Balancers, content delivery networks ("CDNs"), and API endpoints. Customers can also export private certificates and deploy them where they are needed to identify resources, including on-premises servers and Internet of things ("IoT") devices.

In general, public CAs issue and validate certificates for resources on the public internet, whereas private CAs do the same for private networks. In general, applications and browsers are usually preconfigured to trust public certificates automatically by default (by being provided with a list of trusted public certificate authorities for example), whereas an administrator must explicitly configure applications to trust certificates issued by private CAs. Using a public CA can create problems for the customer because in order to be included in the list of trusted certificate authorities by browser and operating system vendors, public CAs must follow strict rules, provide operational visibility, and meet security standards imposed by the browser and operating system vendors. However, administrators of Private CAs can make their own rules for issuing private certificates, including practices for issuing certificates and what information a certificate can include.

In an embodiment, certificates provided via a private CA have various advantages over self-signed certificates. Self-signed certificates are those which are issued without a CA. Unlike certificates issued from a secure root maintained by a CA, self-signed certificates act as their own root. Self-signed certificates can be used to provide on the wire encryption but not to verify identity, and they cannot be revoked. They are generally less secure than certificates issued from a Private CA, but organizations sometimes use them because they are easy to generate, require no expertise or infrastructure, and many applications accept them. There are no controls in place for issuing self-signed certificates. Organizations that use self-signed certificates may incur a greater risk of outages caused by certificate expirations because it is difficult to the track the expiration dates of self-signed certificates.

In an embodiment, use of a PCA solves the problem of securely identifying resources in an organization. A PCA allows the customer to issue private certificates, which identify resources and provide a basis for trusted identity and communications. Examples of things that can be identified with private certificates include API endpoints, TLS/SSL servers, clients, machines, VPN users, IoT devices, and more.

In various embodiments, the PCA provides an API and management console for creating a private CA that can issue and revoke certificates. The PCA provides high availability, redundancy, backup, auditing, and monitoring. The PCA is integrated with a Certificate Manager. Customers create a PCA instance in the management console of the computing resource service provider, and then use the certificate manager console to select a CA from their list of private CAs or the computing resource service provider's public CA, and issue a certificate from the one they selected. The PCA stores the private keys used for issuing certificates on hardware security modules for key protection, which are validated to FIPS 140-2 Level 3 standards for protection against key compromises that could undermine trust in the CA. Customers control access to their PCA resources using security policies. Customers can quickly revoke trust in a compromised certificate which will cause clients to stop trusting it.

In an embodiment, the certificate manager service may be integrated directly with a public CA of the computing resource service provider, which allows customers to obtain public certificates from the computing resource service provider and use them to enable TLS/SSL for services provided by the computing resource service provider. In an embodiment, the private CA service is a feature that is added to the certificate manager that allows an enterprise to issue private certificates from a CA they control. The computing resource service provider operates the CA infrastructure, but customers control the issuance process including who can issue certificates, what fields and values are included in certificates, and how long certificates are valid. Customers can use the certificates to identify servers, clients, smart lights, vehicles, and more.

In an embodiment, the Private CA Service works with the certificate manager. When requesting a certificate from the certificate manager, the customer can choose either a private certificate from your own PCA CA or a public certificate from the computing resource service provider's public CA. The CM provides the customer with a single place that is able to manage both private and public certificates.

In some embodiments, tools are provided for automatically deploying certificates and installing them with applications, such as internal web servers. In some embodiments, customers that want certificates on virtual machine instances or on their own servers call CM APIs to retrieve the certificate and install it for use with their applications. The CM provides APIs for issuing and distributing certificates and automatic renewal.

In an embodiment, customers use security policies to specify who can do what with PCA resources, including CAs, Certificates, and Templates. In an embodiment, customers use pre-configured policies for common roles, such as certificate administrator, CA administrator, CA supervisor, auditor, and template administrator. Customers specify security policies to allow or deny permissions for actions and ARN-addressable PCA resources.

In an embodiment, the certificate management console can be used to create and configure a private CA, and manage an existing CA. In an embodiment, the certificate management console can be used to create reports of all issued or revoked certificates for a CA.

In various embodiments, the following CA key pairs (key types) are supported: 2048 bit and 4096 bit RSA and EC p256 and EC p384. The following signature algorithm combinations are supported: SHA1WITHRSA, SHA256WITHRSA, SHA384WITHRSA, SHA512WITHRSA, ECDSA-WITH-SHA1, ECDSA-WITH-SHA256, ECDSA-WITH-SHA384, ECDSA-WITH-SHA512.

In an embodiment, while PCA is a shared service, the resources created are only accessible to the account that created the PCA. In an embodiment, when the customer uses the console or an API to create a private CA, the API returns an ARN. In an embodiment, the ARN is an identifier that the customer uses to make additional calls to the private CA. In an embodiment, access to use the private CA is restricted through security policies that control which users, groups, and roles can perform which actions on which resources.

In an embodiment, the Private CA management console is integrated with the certificate management service console. In an embodiment, the certificate manager console has two main areas that users select with a left nav. in an embodiment, the two areas are Certificates and Certificate Authorities. In an embodiment, after the user creates a CA in the CA area, the user can request PCA-issued private certificates from the certificate management service's certificates console. In an embodiment, the user can choose the desired PCA CA by selecting it from a drop-down list. In an embodiment, from the certificate management service console the user can list, manage, and deploy certificates for use with other services provided by the computing resource service provider, such as load balancers. In an embodiment, the user can also revoke certificates, manage renewals, and export certificates issued by their PCA private CA and use them on virtual machine instances, on-premises servers, or anywhere.

In an embodiment, the certificate management service automatically renews PCA-issued private certificates if they are in use. In an embodiment, the certificate management service does not renew a PCA-issued certificate that is not in use. In an embodiment, a certificate is in use if a) it is bound to (associated with) other resources of the computing resource service provider, such as load balancers, or b) if the user has exported it since the certificate was issued or since the last time it was renewed. In an embodiment, the certificate management service does not renew certificates that are not in use nor those that have not been exported since being issued or renewed.

In an embodiment, the administrator may be notified by the certificate manager when a certificate is renewed. In an embodiment, the administrator can monitor log events to determine when the certificate management service renews a certificate. In an embodiment, the administrator can take an action, such as exporting the renewed certificate, when the administrator notes the renewal event.

In an embodiment, the certificate manager can obtain private keys in a number of ways. In an embodiment, the certificate manager can generate the private key for PCA-issued certificates. In an embodiment, an administrator can generate the private key and provide a certificate signing request and request a certificate for the CSR from their PCA CA.

In an embodiment, PCA CAs and other CAs may be chained together to form CA hierarchies. An administrator can create a desired CA hierarchy by linking CAs together. For example, an administrator may have an offline root on premises operated by the administrator as the CA root of trust for the administrator's organization. In an embodiment, the administrator is able to chain their PCA CA to their offline root by creating a CSR from their PCA CA, and signing it with their offline root. In an embodiment, PCA CAs can be subordinate to the administrator's offline root CA, or to another PCA CA.

In an embodiment, an administrator can revoke certificates issued in error or issued and later compromised using a certificate management service PCA API. In an embodiment, revoked certificates are no longer trusted by browsers, operating systems, and applications. In an embodiment, the PCA maintains a certificate revocation list, which is a list of all unexpired revoked certificates. In an embodiment, the PCA also provides infrastructure for clients, such as browsers, operating systems, and applications, to check the revocation status of a certificate using standard methods, including CRL distribution points ("CDPs"). In an embodiment, clients can check the revocation status of a certificate by querying the CRL distribution point. In an embodiment, the client can locate them using URLs included in the PCA-issued certificate. In an embodiment, when configuring your PCA CA the administrator may enable public PCA-managed CRL revocation lists. In an embodiment, the PCA populates the Authority Information Access field in each certificate with URLs that identify the CRL distribution point.

Definitions and Abbreviations

Certificate revocation list ("CRL"): a list of certificates that have been revoked. The list is used by clients (relying parties) to determine if a certificate can be trusted. If the certificate in question is on the revocation list, it should not be trusted.

Certificate policy ("CP"): A document maintained by a CA that describes the CA's policies for issuing and otherwise managing certificates.

Certification practices statement ("CPS"): A document maintained by a CA that describes the CA's practices for issuing and managing certificates.

Offline CA: a highly secure root that is never connected to a network. Offline CAs are typically stored in a secure physical enclosure, such as a safe, and used occasionally to issue or revoke certificates used by online CAs.

Online CA: a CA that is connected to the network and used for everyday certificate issuance and revocation.

Online certificate status protocol ("OCSP"): a protocol for checking the revocation status of a certificate. The protocol was designed to provide real-time revocation status and require less network bandwidth compared with certificate revocation lists.

public key infrastructure ("PKI"): a set of processes and policies for creating and managing digital certificates.

Private certificate: a certificate issued by and trusted only within an organization. In contrast to public certificates, which are trusted by browsers, operating systems, and applications by default, private certificates are only trusted if the root public key is explicitly installed in the trust stores of browsers, operating systems, and applications.

Public certificate: Public certificates are issued by public CAs and are trusted by default by most operating systems and browsers. Operating systems and browsers include trust stores that are configured to trust the root certificates of public certificate authorities by default. Public certificate authorities must operate according to specific practices and security standards, maintain good standing with the CA/Browser Forum and application software vendors, and provide visibility into their operations.

Root certificate: the base (root) certificate of a CA hierarchy, consisting of a self-signed certificate that binds the CA name to the public key, and signed by the private key. The root certificate of a CA is typically trusted by default by inclusion in trust stores.

Root key: the base (root) key pair of a CA hierarchy, consisting of a private and public key.

Self-signed certificate: authenticity is asserted only by the creator of the certificate. Similar to a driver's license issued or other photo ID issued by the driver. Self-signed certificates are not trusted by browsers, operating systems, and applications. Browsers that connect to a website with a self-signed certificate generate a warning indicating that the certificate is not trusted.

Certificate Signing Request ("CSR"): a block of encoded text given to CA when applying for a certificate.

Certificate Revocation List ("CRL"): a list of certificate serial numbers that have been revoked.

Online Certificate Status Protocol ("OCSP"): an Internet protocol used for obtaining the revocation status of a certificate.

TBSCertificate: ToBeSignedCertificate is a structure composed of public key and identifying information.

Registration Authority as a Service ("RAaS"): acts as a gatekeeper to restrict types of certificates a CA is allowed to sign.

Step Functions (SFN): in an embodiment, step functions are implemented as step functions. Step functions are a web service that enables the user to coordinate the components of a distributed application using a visual workflow.

Figure 11:
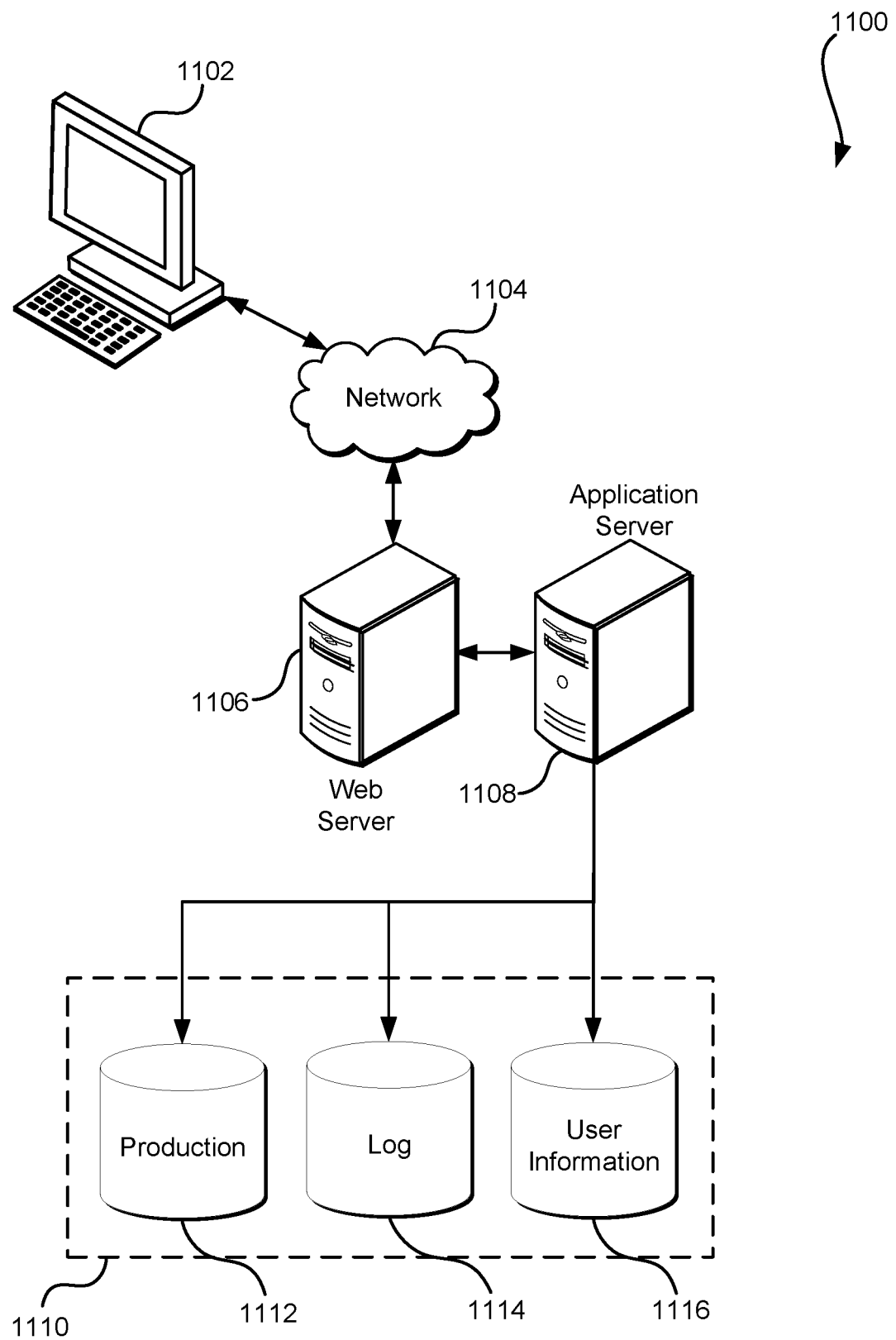
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto and the application server 1108 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 1102. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x_1$, the probably of randomly generating another input $x_2$, different from $x_1$, such that $f(x_1)=f(x_2)$ is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   memory to store computer-executable instructions that, as a result of being executed by the one or more processors, cause the system to:
   provide, to a client computer system associated with an account of a computing resource service provider, an interface for:
      creating a private certificate authority; and
      performing operations to one or more digital certificates;
   obtain, at a certificate management service of the computing resource service provider, a first request from the interface to create a first private certificate authority within a computing resource environment provided by the computing resource service provider;
   provision, based at least in part on a first operation of the certificate management service, a computer system within the computing resource environment to operate as the first private certificate authority in accordance with parameters specified with the first request;

obtain, at the certificate management service over a first communication channel, a second request to perform an operation to a digital certificate of the one or more digital certificates;

generate, by the certificate management service, a determination that an issuer of the digital certificate is a second private certificate authority, the second private certificate authority being:

created based at least in part on a second operation of the certificate management service within the computing resource environment; and accessible, by the client computer system, through an application programming interface provided by the certificate management service, over a second communication channel comprising a distinct protocol from the first communication channel; and based at least in part on the determination, cause the second private certificate authority to perform the second operation by at least providing the second private certificate authority with the second request obtained by the certificate management service through the application programming interface.

2. The system of claim 1, wherein the computer-executable instructions further cause the system to:

provision a hardware security module for use with the first private certificate authority, the hardware security module storing a cryptographic key associated with the first private certificate authority; and generate a digital signature for the digital certificate using the hardware security module.

3. The system of claim 1, wherein:

the interface includes a web page running on the client computer system for entering a parameter of the first request; and the computer-executable instructions further cause the system to:

obtain the parameter from the client computer system.

4. The system of claim 1, wherein the operation is performed on a public certificate authority by at least generating a certificate signing request and submitting the certificate signing request to the public certificate authority.

5. A computer-implemented method, comprising:

obtaining, at a certificate management service of a computing resource service provider and from an interface for creating a private certificate authority and performing an operation to one or more certificates, a first request to create a first private certificate authority over a first communication channel within a first network provided by the computing resource service provider and associated with an account of the computing resource service provider;

provisioning, by the certificate management service, within the first network, a computer system to operate as the first private certificate authority in accordance with a parameter specified with the first request;

obtaining, through an application programming interface at the certificate management service, a second request to perform an operation to a digital certificate of the one or more digital certificates;

identifying, by the certificate management service, from a plurality of certificate authorities that includes a public certificate authority and a second private certificate authority, that the second private certificate authority issued the digital certificate and is:

provisioned at least in part by the certificate management service; and accessible, through the application programming interface, by the plurality of certificate authorities; and causing, based at least in part on the identification, the operation to be performed by the second private certificate authority by at least providing, over a second communication channel comprising a distinct protocol from the first communication channel, the second private certificate authority with the second request through an endpoint of the certificate management service within an environment.

6. The computer-implemented method of claim 5, wherein:

the operation is a certificate signing operation; and performing the operation is accomplished by at least generating a digital signature of the digital certificate.

7. The computer-implemented method of claim 5, wherein:

the computer system is a virtual computer system instance; and the computer system is provisioned by at least provisioning the virtual computer system instance.

8. The computer-implemented method of claim 5, wherein the second private certificate authority is identified by at least:

identifying subject information of the digital certificate; and determining that the second private certificate authority is associated with the subject information.

9. The computer-implemented method of claim 5, wherein the parameter includes information that allows use of a private cryptographic key to be associated with the first private certificate authority.

10. The computer-implemented method of claim 9, wherein the information is an encrypted version of the private cryptographic key that, as a result of being downloaded to a hardware security module, allows the private cryptographic key to be used to generate a digital signature.

11. The computer-implemented method of claim 5, wherein the operation is a certificate signing operation, a certificate renewal operation, or a certificate revocation operation.

12. The computer-implemented method of claim 5, further comprising:

provisioning a hardware security module for performing the operation, the hardware security module storing a cryptographic key associated with the public certificate authority that issued the digital certificate; and performing the operation using the hardware security module.

13. A non-transitory computer-readable storage medium storing thereon executable instructions that, as a result of being executed by one or more processors of a computer system, cause the computer system to at least:

provide, to a client computer system, an interface for creating a private certificate authority and performing an operation to one or more digital certificates;

obtain a request in response to the interface to create a first private certificate authority over a first communication channel within a first network provided by a computing resource service provider;

provision, at least in part by a certificate management service, a computer system to operate as the first private certificate authority in accordance with a parameter specified with the request within the first network;

obtain, at the certificate management service, a request to perform an operation to a digital certificate of the one or more digital certificates, where the request includes an application programming interface (API) call directed to the certificate management service;

identify, from a plurality of certificate authorities that includes a public certificate authority and a second private certificate authority, that the second private certificate authority issued the digital certificate and is:
 provisioned at least in part by the certificate management services; and
 accessible through the API provided by the certificate management service; and cause, based at least in part on the identification, the operation to be performed by at least providing the second private certificate authority with the request through a second communication channel of the certificate management service within an environment, the second communication channel comprising a distinct protocol from the first communication channel.

14. The non-transitory computer-readable storage medium of claim 13, wherein the executable instructions further comprise instructions that, as a result of being executed by the one or more processors, cause the computer system to:
 obtain a template with the request to perform the operation to the digital certificate; and
 perform the operation in accordance with a constraint described in the template.

15. The non-transitory computer-readable storage medium of claim 13, wherein the executable instructions further comprise instructions that, as a result of being executed by the one or more processors, cause the computer system to:
 retrieve certificate information from a data store based on a serial number of the digital certificate; and
 identify the second private certificate authority that issued the digital certificate using the certificate information.

16. The non-transitory computer-readable storage medium of claim 13, wherein the executable instructions further comprise instructions that, as a result of being executed by the one or more processors, cause the computer system to:
 provision a hardware security module for use with the first private certificate authority, the hardware security module storing a cryptographic key associated with the first private certificate authority; and
 generate a digital signature for the digital certificate using the hardware security module.

17. The non-transitory computer-readable storage medium of claim 13, wherein:
 the request to perform the operation to the digital certificate is a certificate signing request; and
 the second private certificate authority is identified based on a subject field of the certificate signing request.

18. The non-transitory computer-readable storage medium of claim 13, wherein:
 the interface includes a web page accessible to a browser running on the client computer system; and
 the executable instructions further comprise instructions that, as a result of being executed by the one or more processors, cause the computer system to:
  obtain the request to perform the operation to the digital certificate in response to a request from the client computer system via the web page accessible to a browser.

19. The non-transitory computer-readable storage medium of claim 13, wherein:
 the operation is a certificate renewal operation; and
 the computer system causes the second private certificate authority to sign a new digital certificate that replaces the digital certificate.

20. The non-transitory computer-readable storage medium of claim 13, wherein:
 the request is obtained from an application running on a client computer system via a network-accessible application programming interface; and
 the request is authenticated using a digital signature of the request.

* * * * *

UNITED STATES PATENT AND TRADEMARK OFFICE
CERTIFICATE OF CORRECTION

PATENT NO. : 11,888,997 B1
APPLICATION NO. : 16/018014
DATED : January 30, 2024
INVENTOR(S) : Peter Zachary Bowen et al.

Page 1 of 1

It is certified that error appears in the above-identified patent and that said Letters Patent is hereby corrected as shown below:

In the Specification

IN THE CROSS-REFERENCE TO RELATED APPLICATION:
Column 1, Line 6, should read as follows:
This application claims the benefit of U.S. Provisional Patent Application No. 62/652,236, filed Apr. 3, 2018, entitled "CERTIFICATE MANAGEMENT SYSTEM," the disclosure of which is herein incorporated in its entirety. This application incorporates by reference for all purposes the full disclosure of U.S. patent application Ser. No. 16/018,004, filed concurrently herewith, entitled "CERTIFICATE AUTHORITY," now issued as U.S. Patent 11,323,274, issued date May 3, 2022, which claims the benefit of U.S. Provisional Patent Application No. 62/652,240, filed Apr. 3, 2018, entitled "PRIVATE CERTIFICATE AUTHORITY," and U.S. Patent Application No. 16/018,009, filed concurrently herewith, entitled "CERTIFICATE GENERATION METHOD," now issued as U.S. Pat. No. 11,563,590, issued date Jan. 24, 2023, which claims the benefit of U.S. Provisional Patent Application No. 62/652,235, filed Apr. 3, 2018, entitled "CERTIFICATE TEMPLATE SYSTEM."

Signed and Sealed this
Eighth Day of October, 2024

Katherine Kelly Vidal
*Director of the United States Patent and Trademark Office*